US011143866B2

(12) United States Patent
Chi et al.

(10) Patent No.: US 11,143,866 B2
(45) Date of Patent: Oct. 12, 2021

(54) WAVEGUIDE INCLUDING VOLUME BRAGG GRATINGS

(71) Applicant: Facebook Technologies, LLC, Menlo Park, CA (US)

(72) Inventors: Wanli Chi, Sammamish, WA (US); Hee Yoon Lee, Bellevue, WA (US); Pasi Saarikko, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/908,448

(22) Filed: Jun. 22, 2020

(65) Prior Publication Data

US 2020/0348514 A1 Nov. 5, 2020

Related U.S. Application Data

(63) Continuation of application No. 16/160,645, filed on Oct. 15, 2018, now Pat. No. 10,725,291.

(51) Int. Cl.
| | |
|---|---|
| *G02B 6/34* | (2006.01) |
| *G02B 27/00* | (2006.01) |
| *F21V 8/00* | (2006.01) |
| *G02B 27/01* | (2006.01) |

(52) U.S. Cl.
CPC ....... *G02B 27/0081* (2013.01); *G02B 6/0035* (2013.01); *G02B 27/0172* (2013.01); *G02B 2027/0125* (2013.01); *G02B 2027/0178* (2013.01)

(58) Field of Classification Search
CPC .............. G02B 27/0081; G02B 6/0035; G02B 27/0172; G02B 2027/0125; G02B 2027/0178; G02B 2027/0112; G02B 2027/0123; G02B 2027/0174
See application file for complete search history.

(56) References Cited

U.S. PATENT DOCUMENTS

| | | | |
|---|---|---|---|
| 10,089,516 B2 | 10/2018 | Popovich et al. | |
| 10,222,620 B2 | 3/2019 | Bohn | |
| 10,241,332 B2 | 3/2019 | Vallius | |
| 2014/0104665 A1 | 4/2014 | Popovich et al. | |
| 2016/0077338 A1* | 3/2016 | Robbins ............. | G02B 27/0172 345/8 |

* cited by examiner

*Primary Examiner* — Ellen E Kim
(74) *Attorney, Agent, or Firm* — Pequignot + Myers; Matthew A. Pequignot

(57) ABSTRACT

A waveguide is provided for conveying image light. The waveguide includes an input port for receiving a first beam of image light carrying an image in a wavelength band. A first diffraction grating of the waveguide includes a plurality of volume Bragg gratings (VBGs) configured to expand the first beam along a first axis and to redirect the first beam towards a second diffraction grating of the waveguide. The second diffraction grating includes a plurality of VBGs configured to receive the first beam from the first diffraction grating and to out-couple different portions of the first wavelength band of the first beam along a second axis, thereby expanding the first beam along the second axis for observation of the image by a user.

20 Claims, 24 Drawing Sheets

View B

View C

WAVEGUIDE INCLUDING VOLUME BRAGG GRATINGS

REFERENCE TO RELATED APPLICATION

The present invention is a continuation of U.S. patent application Ser. No. 16/160,645 filed on Oct. 15, 2018 and incorporated herein by reference in its entirety.

TECHNICAL FIELD

The present disclosure relates to optical components and modules, and in particular to optical waveguide based components and modules usable in display systems.

BACKGROUND

Head-mounted displays (HMDs), near-eye displays, and other kinds of wearable display systems can be used to provide virtual scenery to a user, or to augment a real scenery with additional information or virtual objects. The virtual or augmented scenery can be three-dimensional (3D) to enhance the experience and to match virtual objects to the real 3D scenery observed by the user. In some display systems, a head and/or eye position and orientation of the user are tracked in real time, and the displayed scenery is dynamically adjusted depending on the user's head orientation and gaze direction, to provide experience of immersion into a simulated or augmented 3D environment.

Lightweight and compact near-eye displays reduce the strain on user's head and neck, and are generally more comfortable to wear. The optics can be the heaviest module of the display. Compact planar optical components, such as waveguides, gratings, Fresnel lenses, etc., can be used to reduce size and weight of an optics block. However, compact planar optics may have limitations related to image resolution, image quality, ability to see the real world through the display, field of view of generated imagery, etc.

BRIEF DESCRIPTION OF THE DRAWINGS

Exemplary embodiments will now be described in conjunction with the drawings, in which.

DETAILED DESCRIPTION

Figure 1A:
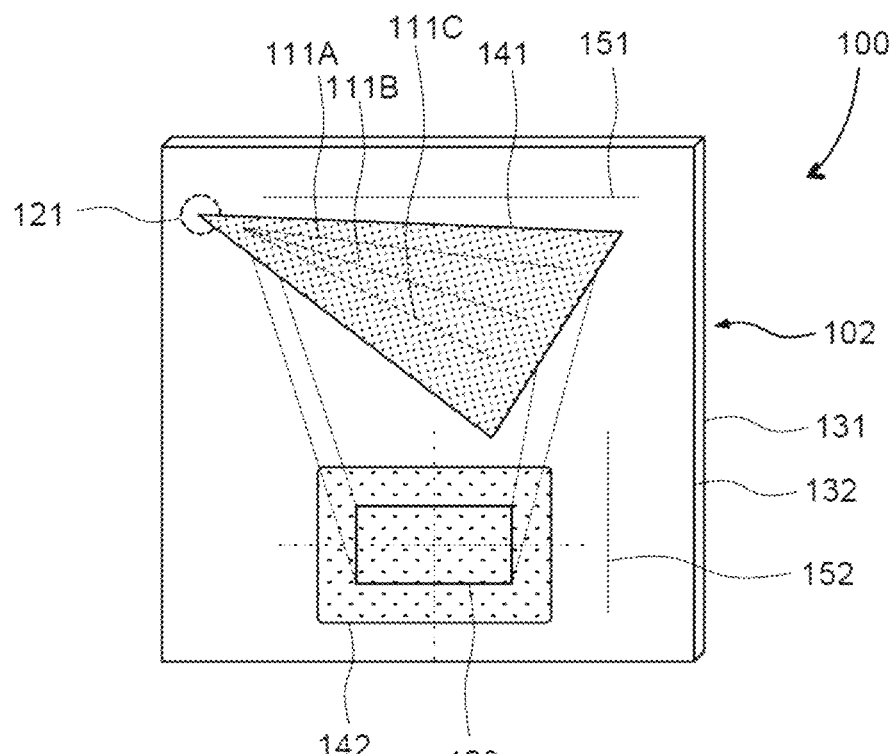
FIG. 1A is a plan (XY plane) view of a near-eye display (NED) including a waveguide of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 1B, 2A-2C, 5, 6, 8, 9, 11A, 11B, 12, and 13A-13G, similar elements are denoted with similar reference numerals.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

In accordance with an aspect of this disclosure, a waveguide may include a diffraction grating configured for pupil expansion along one axis coupled to another diffraction grating configured for pupil expansion along another, e.g. perpendicular axis, and for out-coupling of the light for observation by a user. The user may observe the external world through the second grating. To reduce haze caused by multiple volume Bragg gratings (VBGs) of the second grating, the latter may be configured to output different wavelengths of a same color channel of he image to be displayed at different locations along the second direction, thereby reducing required VBG density and associated haze. In other words, the pupil is expanded in the second direction by wavelength division.

In accordance with an aspect of the present disclosure, a waveguide for carrying image light may include multiple input ports for receiving optical beams each carrying a portion of field of view (FOV) of the image being displayed. Grating structures of the waveguide may be configured to expand output pupil of the waveguide while out-coupling the portions of the FOV for observation by a user in such a manner that the user perceives a single, large FOV. The FOV can be increased by using multiple input ports.

In accordance with the present disclosure, there is provided a waveguide for conveying image light carrying an image having a field of view (FOV). The waveguide includes first and second input ports for receiving first and second beams of image light carrying first and second portions, respectively, of the FOV of the image; opposed first and second outer optical surfaces for propagating the first and second beams therebetween; and a first diffraction grating configured to expand the first and second beams along a first axis, wherein the first and second beams are out-coupled from the waveguide for observation of the first and second portions of the FOV of the image by a user. The first and second portions of the FOV may be conterminous or partially overlapping. The first and second input ports may be coupled to the first optical surface on opposite sides of the waveguide. The first and second beams of image light may carry a color channel of the image.

In some embodiments, a second diffraction grating may be provided in the waveguide. The first and second diffraction gratings may be disposed in the waveguide between the first and second optical surfaces and offset laterally from each other. The first diffraction grating may include a plurality of volume Bragg gratings (VBGs) configured to expand the first and second beams along the first axis and to redirect the first and second beams towards the second diffraction grating. The second diffraction grating may include a plurality of VBGs configured to receive the first and second beams from the first diffraction grating, to expand the first and second beams along a second axis, and to out-couple the first and second beams from the waveguide for observation of the first and second portions of the FOV of the image by the user.

In some embodiments, projections of the first and second diffraction gratings onto the first optical surface are non-overlapping. The first and second input ports may be coupled to the first optical surface on opposite sides of the waveguide, and each one of the first and second diffraction gratings may be symmetric with respect to an axis equidistant from the first and second input ports.

The first and second beams of image light may carry at least one color channel of the image. In embodiments where more than one color channel is present, the waveguide may further include third and fourth input ports for receiving third and fourth beams of image light carrying the first and second portions, respectively, of the FOV of the image, the third and fourth beams of image light carrying a second color channel of the image. A third diffraction grating may be disposed in the waveguide between the first and second optical surfaces and offset laterally from the first and second diffraction gratings. The third diffraction grating may include a plurality of VBGs configured to expand the third and fourth beams along the first axis and to redirect the third and fourth beams towards the second diffraction grating. The VBGs of the second diffraction grating may be configured to receive the third and fourth beams from the third diffraction grating, to expand the third and fourth beams along the second axis, and to out-couple the third and fourth beams from the waveguide for observation of the image by the user.

In embodiments where at least three color channels are present, the waveguide may further include fifth and sixth input ports for receiving fifth and sixth beams of image light carrying the first and second portions, respectively, of the FOV of the image, the fifth and sixth beams of image light carrying a third color channel of the image. A fourth diffraction gratings may be disposed in the waveguide between the first and second optical surfaces and offset laterally from the first to third diffraction gratings. The fourth diffraction grating may include a plurality of VBGs configured to expand the fifth and sixth beams along the first axis and to redirect the fifth and sixth beams towards the second diffraction grating. The VBGs of the second diffraction grating may be configured to receive the fifth and sixth beams from the fourth diffraction grating, to expand the fifth and sixth beams along the second axis, and to out-couple the fifth and sixth beams from the waveguide for observation of the image by the user.

In accordance with the present disclosure, there is provided a waveguide for conveying image light. The waveguide includes a first input port for receiving a first beam of image light carrying an image in a first wavelength band, opposed first and second outer optical surfaces for propagating the first beam therebetween, and first and second diffraction gratings disposed in the waveguide between the first and second optical surfaces and offset laterally from each other. The first diffraction grating may include a plurality of VBGs configured to expand the first beam along a first axis and to redirect the first beam towards the second diffraction grating. The second diffraction grating may include a plurality of VBGs configured to receive the first beam from the first diffraction grating and to out-couple different portions of the first wavelength band of the first beam along a second axis, thereby expanding the first beam along the second axis for observation of the image by a user.

In some embodiments, projections of the first and second diffraction gratings onto the first optical surface are non-overlapping. The first diffraction grating may include e.g. between 300 and 1000 VBGs, and the second diffraction grating may include e.g. between 10 and 200 VBGs. The first wavelength band may correspond to a color channel of the image.

In some embodiments, a second input port may be provided in the waveguide for receiving a second beam of image light carrying the image in a second wavelength band. A third diffraction grating may be disposed in the waveguide between the first and second optical surfaces and offset laterally from the first and second diffraction gratings. The third diffraction grating may include a plurality of VBGs configured to expand the second beam along the first axis and to redirect the second beam towards the second diffraction grating. The VBGs of the second diffraction grating may be configured to receive the second beam from the third diffraction grating and to out-couple different portions of the second wavelength band of the second beam along the second axis, thereby expanding the second beam along the second axis for observation of the image by the user.

A third input port may be further provided in the waveguide for receiving a third beam of image light carrying the image in a third wavelength band. A fourth diffraction grating may be disposed in the waveguide between the first and second optical surfaces and offset laterally from the first to third diffraction gratings. The fourth diffraction grating may include a plurality of VBGs configured to expand the third beam along the first axis and to redirect the third beam towards the second diffraction grating. The VBGs of the second diffraction grating may be configured to receive the third beam from the fourth diffraction grating and to out-couple different portions of the third wavelength band of the third beam along the second axis, thereby expanding the third beam along the second axis for observation of the image by the user. The first, second, and third input ports may be offset from each other along the second axis, and the first, second, and third wavelength bands may correspond to first, second, and third color channels of the image, respectively. The VBGs of the first and second diffraction gratings may be disposed in a same layer spaced apart from the first and second optical surfaces.

In at least some of the above embodiments, the VBGs of the first diffraction grating may have grating periods spatially varying along the first axis, e.g. within a range of 100 nm to 500 nm. The VBGs of the second diffraction grating may also have grating periods spatially varying along the second axis, e.g. within a range of 100 nm to 300 nm. In embodiments where the VBGs of the first diffraction grating are configured to redirect the first and second beams of image light by reflective diffraction, the VBGs of the first diffraction grating may include a plurality of fringes forming an angle with the first optical surface of between 34 degrees and 54 degrees, for example. In embodiments wherein the VBGs of the first diffraction grating are configured to redirect the first and second beams of image light by transmissive diffraction, the VBGs of the first diffraction grating may include a plurality of fringes forming an angle with the first optical surface of greater than 80 degrees, for example. In any of the above embodiments, the VBGs of the second diffraction grating may include a plurality of fringes forming an angle with the first optical surface of between 20 degrees and 38 degrees, or between 50 degrees and 70 degrees, for example. In embodiments where the first and second beams carry the image in a first wavelength band corresponding to a color channel, the VBGs of the second diffraction grating may be configured to receive the first and second beams from the first diffraction grating and to out-couple different portions of the first wavelength band of the first and second beams along the second axis, thereby expanding the first and second beams along the second axis.

Figure 1B:
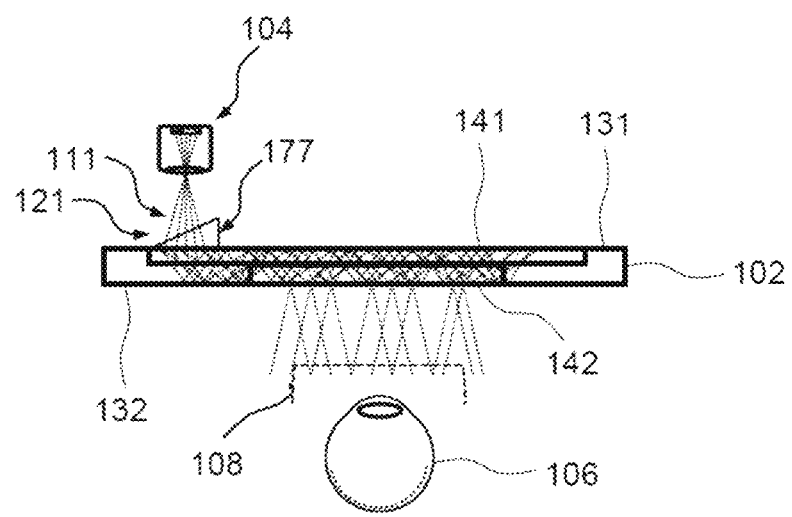
FIG. 1B is a side cross-sectional view of the NED of FIG. 1A.

Referring now to FIGS. 1A and 1B, a near-eye display (NED) 100 includes a waveguide 102 optically coupled to a projector 104. The waveguide 102 is configured for conveying a beam 111 of image light emitted by the projector 104. The waveguide 102 can be based on a transparent flat slab or plate having opposed first 131 and second 132 outer optical surfaces for propagating the beam 111 between the optical surfaces 131, 132, e.g. in a zigzag pattern by total internal reflection (TIR). An input port 121 may be provided for receiving the beam 111. An input coupler, such as a prism 177, may be placed at the input port 121 for coupling the beam 111 into the waveguide 102 for subsequent propagation in the waveguide 102. The optical surfaces 131, 132 may include outside parallel surfaces of the transparent plate, outside surfaces of volume Bragg gratings (VBGs), or surface-relief gratings (SRGs), for example. In some embodiments, the first 131 and second 132 optical surfaces may belong to different parallel substrates separated by an air gap in which the beam 111 propagates.

A first diffraction grating 141 of waveguide 102 may include SRGs, VBGs, or both types of gratings. The first diffraction grating 141 is configured to expand the beam 111 along a first axis 151. Herein, the term "to expand the beam along an axis" means that a projection of the beam 111 onto the first axis 151 is expanded. It is to be noted that for the projection to be expanded, the beam does not have to expand exactly parallel to the axis 151, but the direction of beam 111 expansion may form an angle, e.g. less than 45 degrees, to that axis 151, such that the projection of the beam 111 on the axis 151 is expanded. For example, in FIG. 1A, different beam portions 111A, 111B, 111C may expand along directions forming acute angle with the first axis 151. Note that the first axis 151 simply refers to an orientation, that is, horizontal orientation in FIG. 1A. The orientation may also be referenced relative to an edge of the waveguide 102 or to another axis, for example a second axis 152, which is disposed vertically in FIG. 1A and perpendicular to the first axis 151.

The expanded beam portions 111A, 111B, 111C are eventually directed by the first diffraction grating 141 towards a second diffraction grating 142, which is offset downwards in FIG. 1A, i.e. along the second axis 152, relative to the first diffraction grating 141. The first 141 and second 142 diffraction gratings may be offset entirely, such that their projections on the first optical surface 131 do not overlap i.e. as shown in FIG. 1A, or they may be offset and overlap only partially. The first 141 and second 142 diffraction gratings may be disposed in the waveguide 102 between the first 131 and second 132 outer optical surfaces, e.g. offset to be adjacent respective first 131 and second 132 optical surfaces as shown in FIG. 1B, centered in the waveguide 102, or disposed at an arbitrary depth in the waveguide 102. The second diffraction grating 142 may include SRGs, VBGs, or both types of gratings. The second diffraction grating 142 is configured to receive the beam 111 from the first diffraction grating 141, to expand the beam 111 along the second axis 152, and to out-couple the beam 111 from the waveguide 102 for observation of the first and second portions of the FOV of the image by a user's eye 106 located at an eyebox 108. Throughout this disclosure, the term "eyebox" refers to a geometrical three-dimensional (3D) area where the displayed image has an acceptable quality.

Figure 2A:
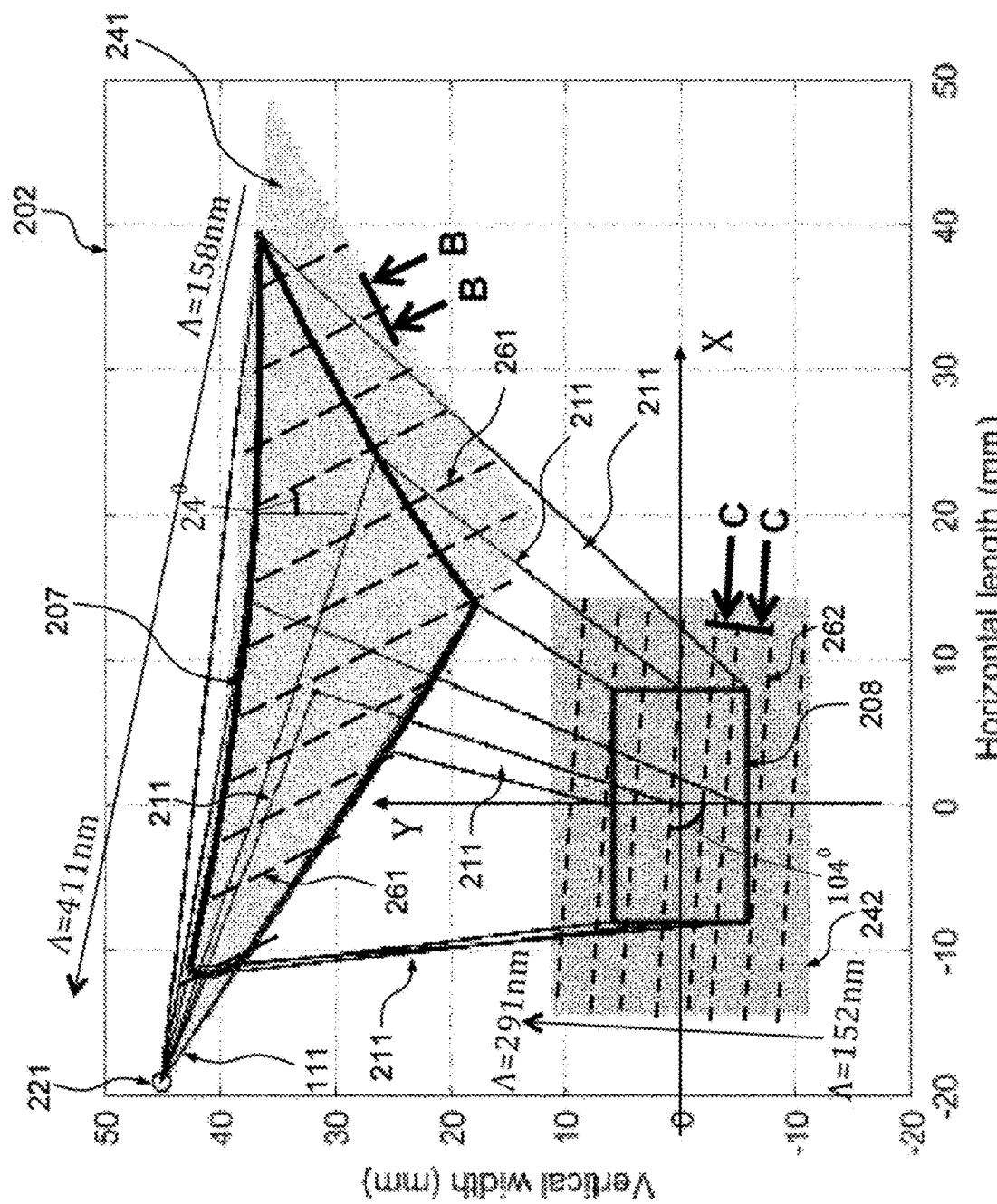
FIG. 2A is a plan ray-trace view of an embodiment of the waveguide of FIGS. 1A and 1B including reflective volume Bragg gratings (VBGs) in the top grating.

Referring to FIG. 2A, a waveguide 202 is an embodiment of the waveguide 102 of FIGS. 1A and 1B. The waveguide 202 of FIG. 2A includes an input port 221, a first diffraction grating 241, and a second diffraction grating 242. The beam 111 is coupled into the waveguide 202 at the input port 221. The first diffraction grating 241 includes a first plurality of VBGs having fringes 261 shown by long-dash lines. The fringes 261 of VBGs of the first diffraction grating 241 are configured to expand the beam 111 along X-axis, and to direct the beam 111 towards the second diffraction grating 242, as shown schematically with rays 211. It is noted that the term "expand the beam 111 along X-axis" includes cases where portions of the beam 111 propagate at an angle to the X-axis, similar to what was explained above with reference to FIG. 1A. The term "expanding a beam along an axis" throughput this disclosure generally includes beams expanded at an angle to the axis. For example, rays 211 in FIG. 2A propagate in the first diffraction grating 241 at various angles to the X-axis. It is further noted that the rays 211 of the beam 111 propagate in a zigzag pattern between the first 131 and second 132 optical surfaces by TIR from the first 131 and second 132 optical surfaces. The zigzag patterns are seen as straight lines in FIG. 2A, because they are viewed from top in FIG. 2A. In the embodiment shown in FIG. 2A, the period of the fringes 261, measured along a corresponding k-vector of the grating, varies from about 158 nm to 411 nm. The fringe period variation is required so that the rays 211 have a sharper diffraction angle on the right end of the first diffraction grating 241 (shorter periods) as compared to the left end of the first diffraction grating 241 (longer periods). Grating period is chosen such that Bragg conditions are satisfied for rays 211 at various locations and at all the display wavelengths. Typically, the grating periods of the first diffraction grating 241 VBGs may vary within a range of 100 nm to 500 nm.

The second diffraction grating 242 includes a second plurality of VBGs having fringes 262 shown by short-dash lines. The VBGs of the second diffraction grating 242 are configured to receive the beam 111 from the first diffraction grating 241, to expand the beam 111 along Y-axis, and to out-couple the beam 111 from the waveguide 202 for observation of the image carried by the beam 111 by a user. Eyebox 208 is typically smaller in size than the second diffraction grating 242. Solid line 207 on the first diffraction grating 241 denotes a boundary of the rays 211 reaching the user's eye placed at center of eyebox with coordinate of (0,0, Z), where Z is eye relief distance, normally 15-20 mm. The period of the fringes 262 of the second diffraction grating 242 varies from about 152 nm to 291 nm. The fringe period variation is required to expand the output pupil along Y-axis by using wavelength division pupil expansion, which will be described further below. Typically, the grating periods of the VBGs of the second diffraction grating 242 may vary within a range of 100 nm to 300 nm.

Figure 2B:
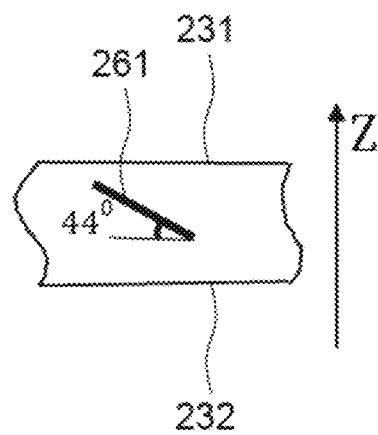
FIGS. 2B and 2C are side cross-sectional cutout views of the waveguide of FIG. 2A along lines B-B and C-C respectively.

The fringes 261 of the VBGs of the first diffraction grating 241 are oriented at approximately 24 degrees with respect to Y-axis and have a tilt with respect to first 231 and second 232 optical surfaces of the waveguide of about 44 degrees, as shown in FIG. 2B. The tilt angle may be between 34 degrees and 54 degrees. In this tilt angle range, the VBGs redirect the beam 111 of image light primarily by reflective diffraction.

Figure 2C:
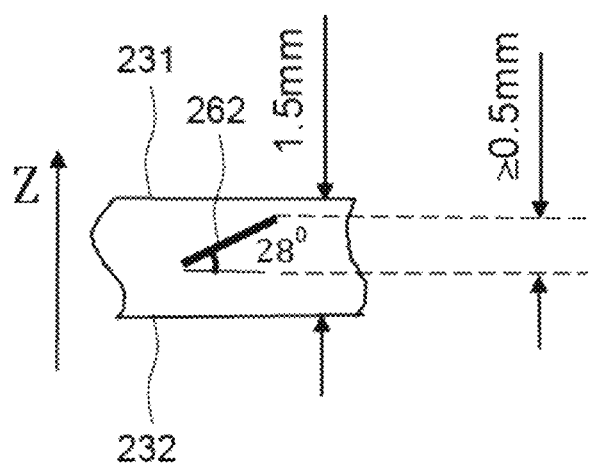

The fringes 262 of the second plurality of VBGs are oriented at approximately 104 degrees with respect to Y-axis and have a tilt with respect to first 231 and second 232 optical surfaces of the waveguide of about 28 degrees, as shown in FIG. 2C. In a typical embodiment, the angle may be between 20 degrees and 38 degrees. At thickness of the waveguide 202 of 1.5 mm, the first 241 and second 242 diffraction gratings may have a thickness of about 0.5 mm or more, that is, about one third of the waveguide 202 thickness, or more. The first 241 and second 242 diffraction gratings may be disposed in a same layer spaced apart from the first 231 and second 232 optical surfaces. The overall size of the waveguide 202 of FIG. 2A, having reflective first 241 and second 242 diffraction gratings, is 70×70 mm.

Figure 3:
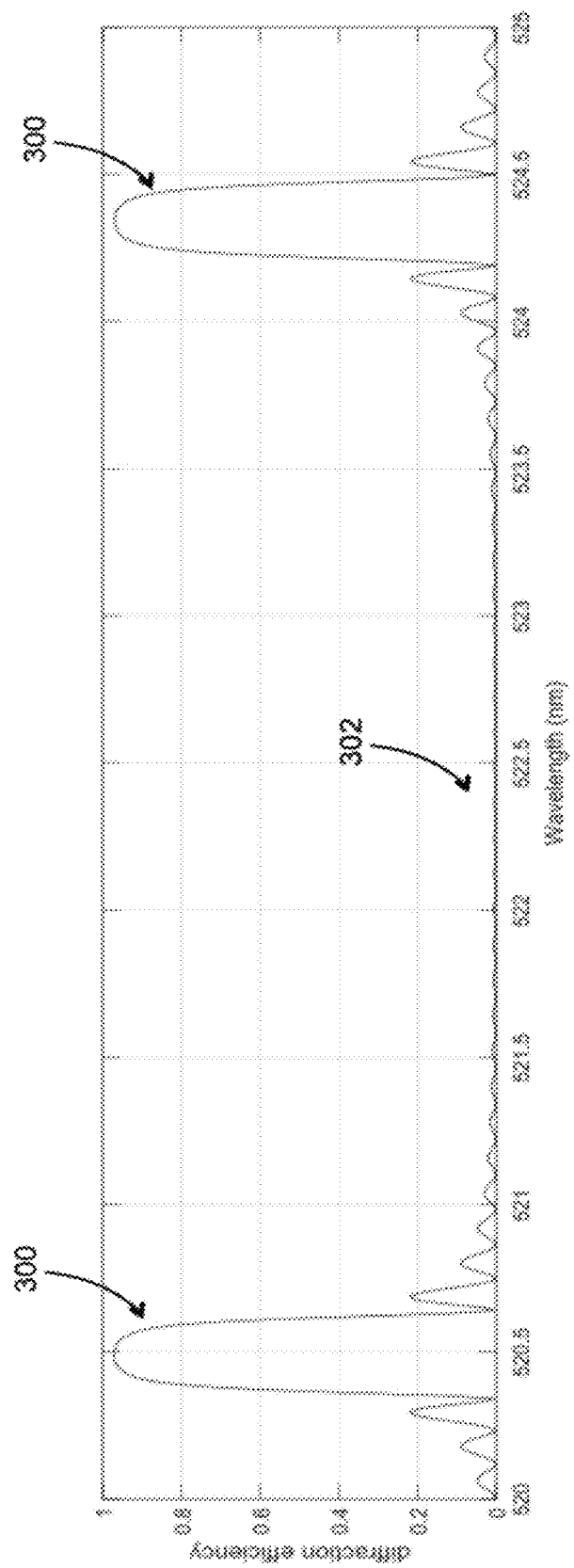
FIG. 3 is an example diffraction efficiency spectrum of a single volume Bragg grating (VBG) usable in waveguides of this disclosure.

Turning to FIG. 3, a diffraction efficiency spectrum of a typical VBG of the first 241 or second 242 diffraction gratings includes sharp peaks 300 of high efficiency, the peaks having a spectral width of about 0.2 nm. The peaks are separated by approximately 3.5 nm wide areas 302 of low diffraction efficiency. At a given wavelength, the diffraction efficiency also depends on angle of incidence. To provide high efficiency in a wavelength range of a typical color channel, e.g. 20 nm, in a field of view (FOV) of several tens of degrees in X- and Y-direction, many VBGs may need to be formed. By way of a non-limiting example, the first diffraction grating 241 may include between 300 and 1000 VBGs. For augmented reality (AR) applications, it may be desirable to limit or reduce the number of VBGs in the second diffraction grating 242, because the second diffraction grating 242 is disposed against user's eye, and the user views the outside world through the second diffraction grating 242. Many VBGs in the view of the eye can make the views of the outside objects hazy or color-fringed, and they can also reduce the contrast of the displayed virtual world image. For at least these reasons, it may be preferable to limit the number of VBGs in the second diffraction grating 242, e.g. to between 10 and 200 VBGs.

Figure 4A:
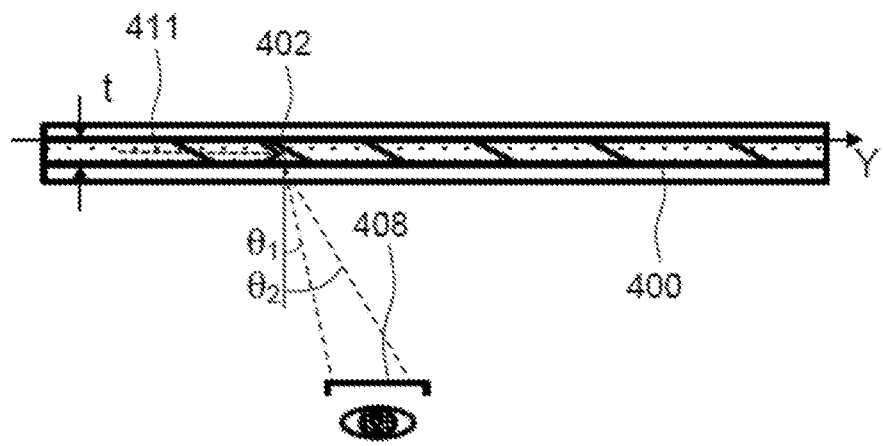
FIG. 4A is a side cross-sectional view of a waveguide including a VBG layer.
Figure 4B:
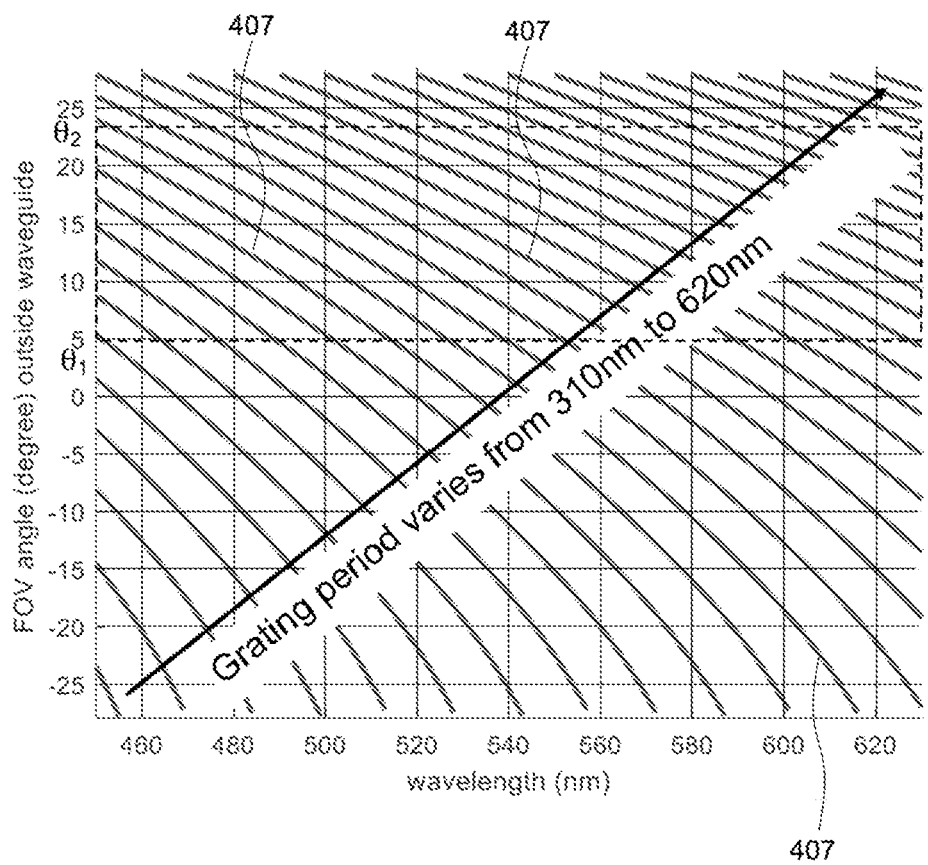
FIG. 4B is a plot of FOV vs. wavelength for different VBG periods.

In accordance with the present disclosure, the number of VBGs in the second diffraction grating 242 required for good image quality in the eyebox 208 may be reduced by allowing light at different wavelengths to be out-coupled from the waveguide 202 at different locations of the eyebox 208. Referring to FIG. 4A, an example of such a sparse diffraction grating 400 is shown in cross-section. The diffraction grating 400 has a thickness t, extends along Y-axis, and has a VBG period varying along the Y-axis. Image light 411 destined for an eyebox 408 is out-coupled at a location 402 of the diffraction grating 400 at an out-coupling angle θ which depends on wavelength and VBG period at that location 402. Such a dependence is shown in FIG. 4B, where the out-coupling angle θ is plotted as a function of wavelength for different VBG periods. To obtain a range of grating periods at the location 402, a range of out-coupling angles θ is first determined based on the required size of the eyebox 408 and the eye relief, which is approximately equal to the distance between the diffraction grating 400 and the eyebox 408. In the example illustrated in FIG. 4A, the out-coupling angle θ ranges from $θ_1=5$ degrees to $θ_2=23$ degrees. Once the values of $θ_1$ and $θ_2$ at the location 402 are determined, FIG. 4B is consulted to obtain a corresponding range of VBG periods. In FIG. 4B, different slanted lines 407 represent different VBG periods varying from 310 nm to 620 nm along Y-axis. In this example, VBG periods at the location 402 need to cover a range from 360 nm to 590 nm for the image light 411 in the wavelength band of 450 nm to 630 nm to be diffracted out to the eyebox 408. VBGs with 360 nm grating period can diffract blue image light at 460 nm to the eyebox 408 at θ=5 degrees, and VBGs with 380 nm grating period can diffract beam wavelength of 460 nm to the eyebox 408 at θ=10 degrees; this same grating can diffract 480 nm wavelength light at θ=5 degrees, and so on. There is a small VBG period change from the location 402 to a neighboring location. The small VBG period change can cause small out-coupling wavelength shift at different locations of the eyebox 408 for a fixed FOV angle θ. While this may result in a slight color shift across the eyebox 408, this color shift may be acceptable when the wavelength band is narrow enough and belongs to a single color channel of the image to be displayed. By way of a non-limiting example, for a red color channel, a wavelength band of between 620 nm and 660 nm may be selected—light at any of these wavelengths is generally perceived as red. The pupil expansion by wavelength division described herein has the advantage of reduced number of VBGs required to cover the FOV of interest. For example, as few as 10 to 200 VBGs per color channel may be required for a single color channel.

Figure 5:
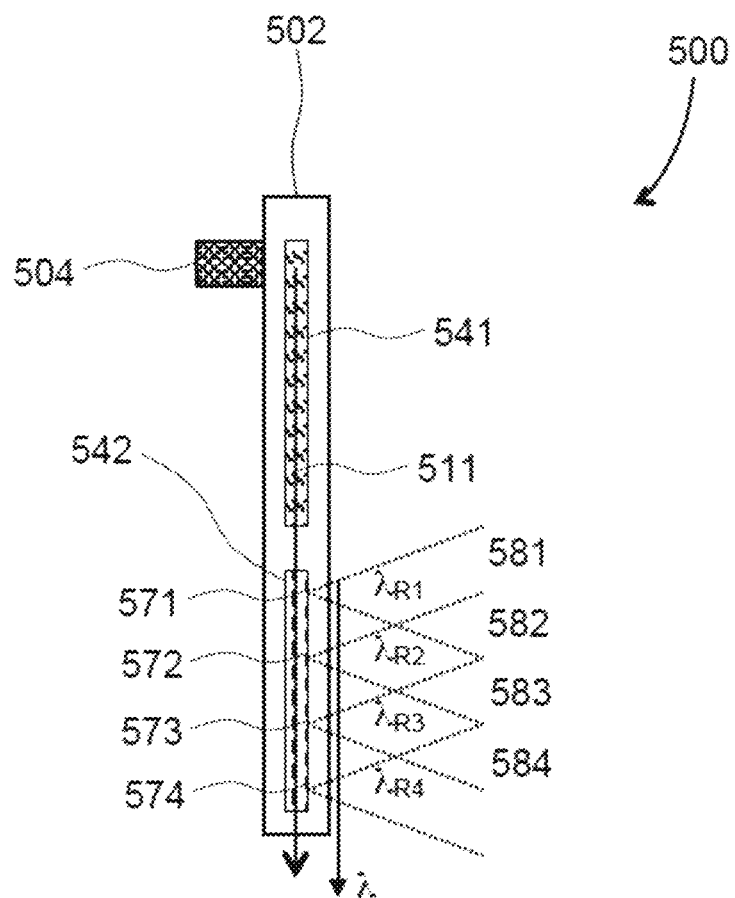
FIG. 5 is a side cross-sectional view of an NED including a waveguide of this disclosure, illustrating a principle of pupil expansion by wavelength division.

The principle of pupil expansion by wavelength division is further illustrated in FIG. 5. An NED 500 includes a waveguide 502 coupled to an image projector 504. The waveguide 502 includes first 541 and second 542 diffraction gratings. The first diffraction grating 541 spreads an image beam 511 in a direction perpendicular to the plane of FIG. 5, and the second diffraction grating 542 spreads the image beam 511 vertically in FIG. 5. For red (R) channel, light 581 at a first red wavelength $λ_{R1}$ is out-coupled at a first location 571; light 582 at a second red wavelength $λ_{R2}$ is out-coupled at a second location 572; light 583 at a third red wavelength $λ_{R3}$ is out-coupled at a third location 573; and light 584 at a fourth red wavelength $λ_{R4}$ is out-coupled at a fourth location 574. It is to be understood that the wavelengths $λ_{R1}$, $λ_{R2}$, $λ_{R3}$, and $λ_{R4}$ are center wavelengths of a rather broad wavelength band, i.e. at the first location 571, the light 581 occupies a wavelength band of e.g. 600 nm to 640 nm; at the second location 572, the light 582 occupies a wavelength band of e.g. 601 nm to 641 nm; at the third location 573, the light 583 occupies a wavelength band of e.g. 602 nm to 642 nm, and so on, such that a color shift can be rather small when compared to the wavelength bandwidth, which further reduces a perceived color shift across the eyebox 408. The out-coupling of green (G) and blue (B) channels may be configured similarly, overlapping with the out-coupling of the R channel.

Figure 6:
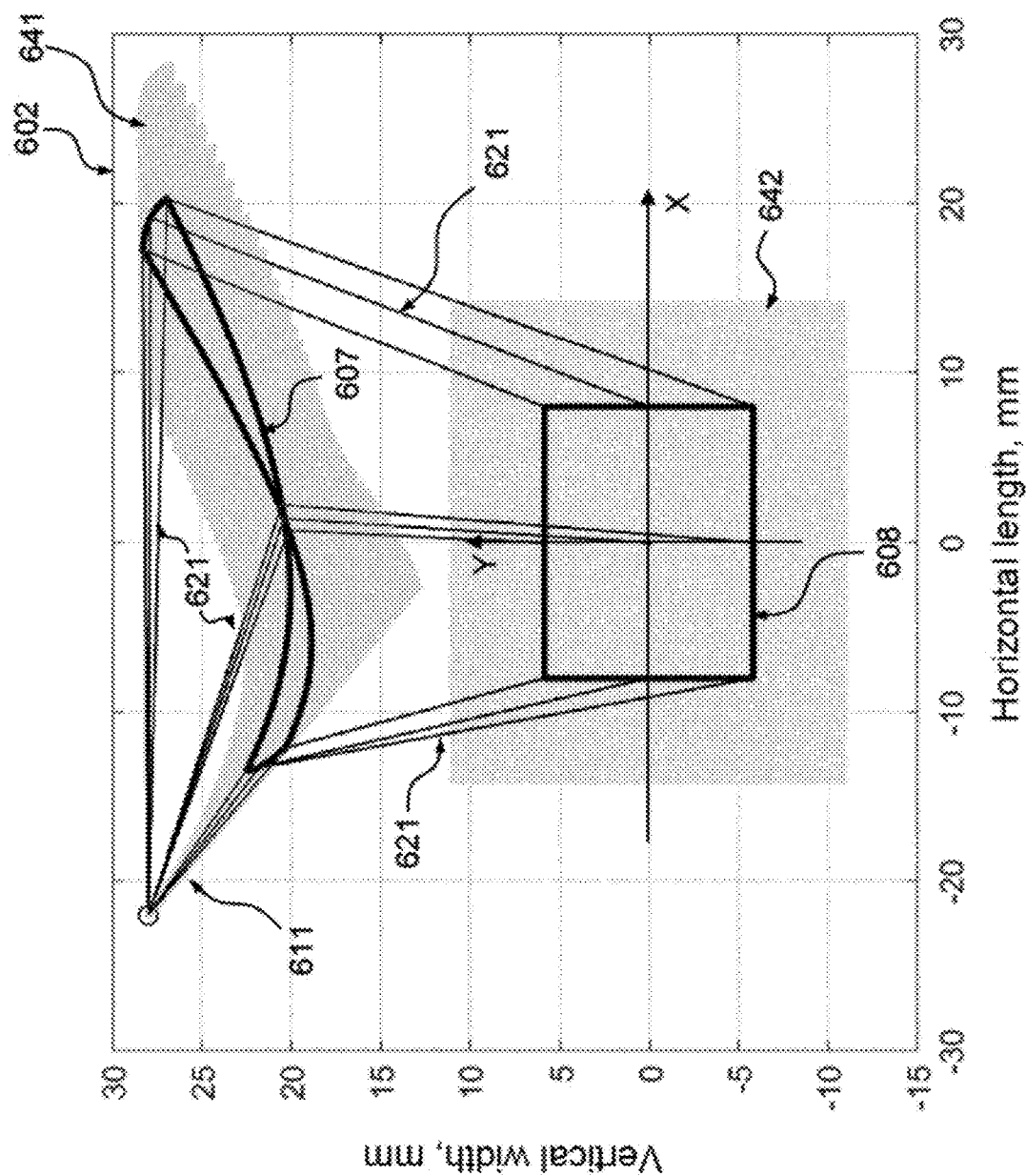
FIG. 6 is a plan ray-trace view of an embodiment of the waveguide of FIGS. 1A and 1B including transmissive diffraction VBGs in the top grating.

Referring to FIG. 6, a waveguide 602 is an embodiment of the waveguide 102 of FIGS. 1A and 1B, and the waveguide 202 of FIG. 2A. The waveguide 602 of FIG. 6 includes a first diffraction grating 641 and a second diffraction grating 642, each comprising a plurality of VBGs in a similar manner as the first diffraction grating 241 and the second diffraction grating 242 of FIG. 2A; the fringes of the VBGs are not illustrated in FIG. 6 for simplicity. The VBGs of the first diffraction grating 641 are configured to expand an image beam 611 along X-axis and to direct the image beam 611 towards the second diffraction grating 642, as shown schematically with individual rays 621 of the image beam 611. The VBGs of the second diffraction grating 642 are configured to receive the beam 611 from the first diffraction grating 641, to expand the beam 611 along Y-axis, and to out-couple the beam 611 from the waveguide 602 for observation of the image carried by the beam 611 by a user. Solid line 607 on the first diffraction grating 641 denotes a boundary of the rays 621 reaching the user's eye placed at the center of an eyebox 608.

The VBG fringes of the first diffraction grating 641 form an angle of 34 degrees with Y-axis and are oriented at about 90 degrees w.r.t. the optical surfaces of the waveguide 602. At angles of greater than approximately 80 degrees, the VBG fringes of the first diffraction grating 641 redirect the first and second beams of image light mostly by transmissive diffraction (transmissive grating configuration). The VBG fringes of the second diffraction grating 642 form an angle of 94 degrees with Y-axis and are oriented at about 59 degrees w.r.t. the optical surfaces of the waveguide 602. More generally, the VBG fringes of the second diffraction grating 642 may form an angle with the optical surfaces of the waveguide 602 of between 50 degrees and 70 degrees. The overall size of the waveguide 602 of FIG. 6 is 45×60 mm, which is only 55% of the waveguide 202 of FIG. 2A by area.

Figure 7A:
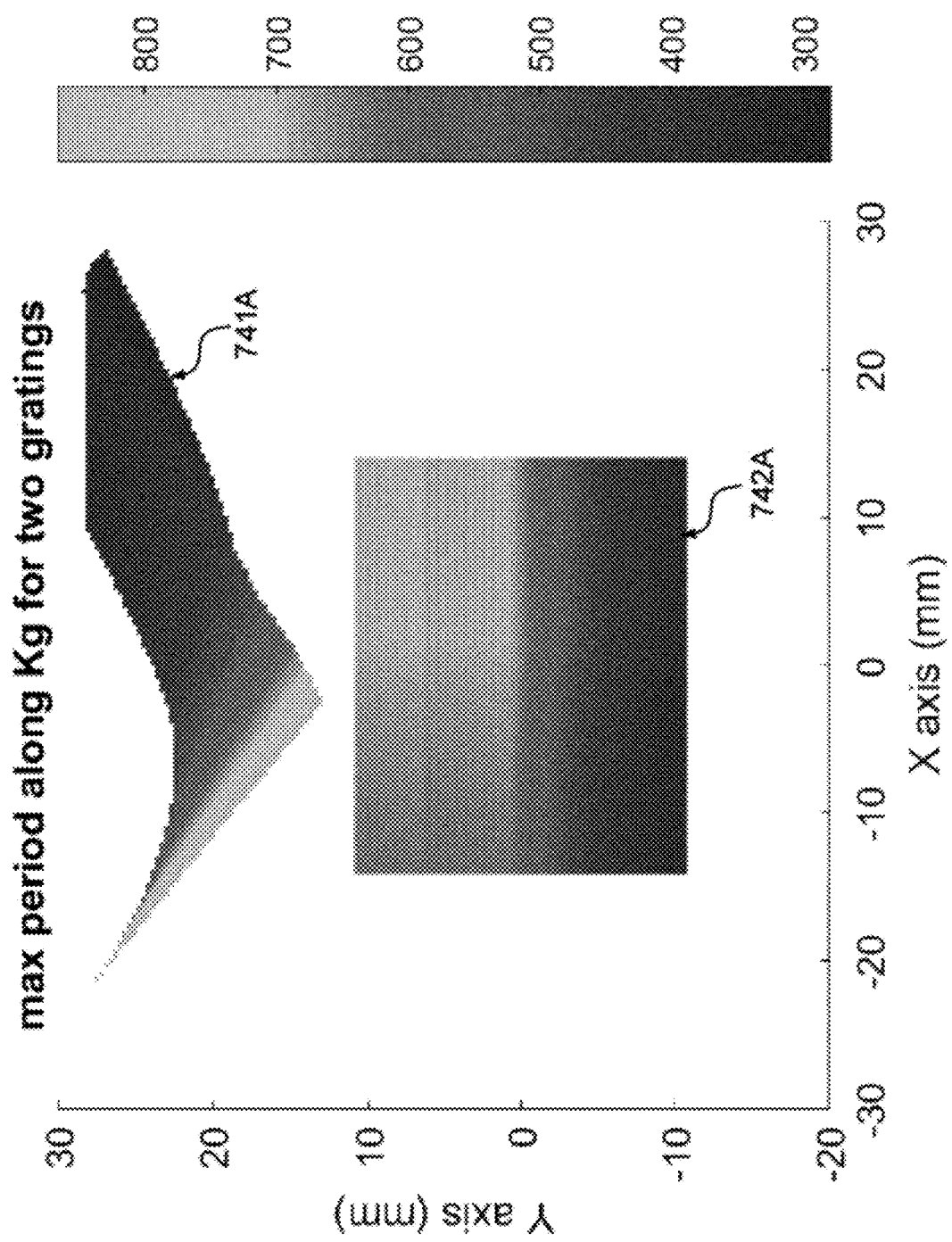
FIGS. 7A and 7B are maximum and minimum VBG period maps of diffraction gratings of the waveguide of FIG. 6.
Figure 7B:
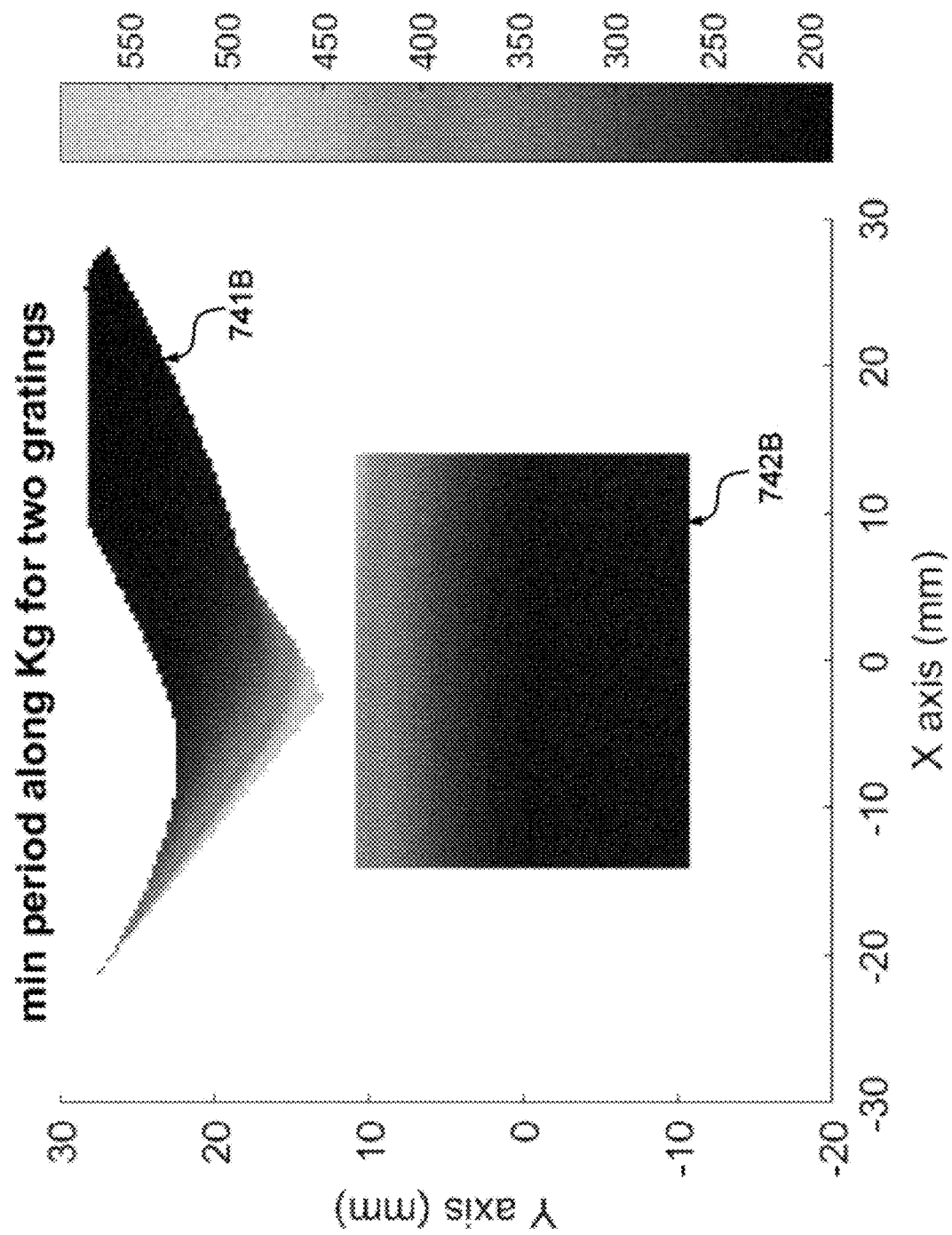

The period of the fringes of the first 641 and second 642 diffraction gratings is spatially varying. The spatial variation of the grating periods is illustrated in FIGS. 7A and 7B, which show density maps of the fringes for both diffraction gratings 641 and 642. FIG. 7A shows a maximum fringe period map 741A for the first diffraction grating 641 and a maximum fringe period map 742A for the second diffraction grating 642, both measured along the grating vector Kg. FIG. 7B shows a minimum fringe period map 741B for the first diffraction grating 641 and a maximum fringe period map 742B for the second diffraction grating 642, both measured along the grating vector Kg.

Figure 8:
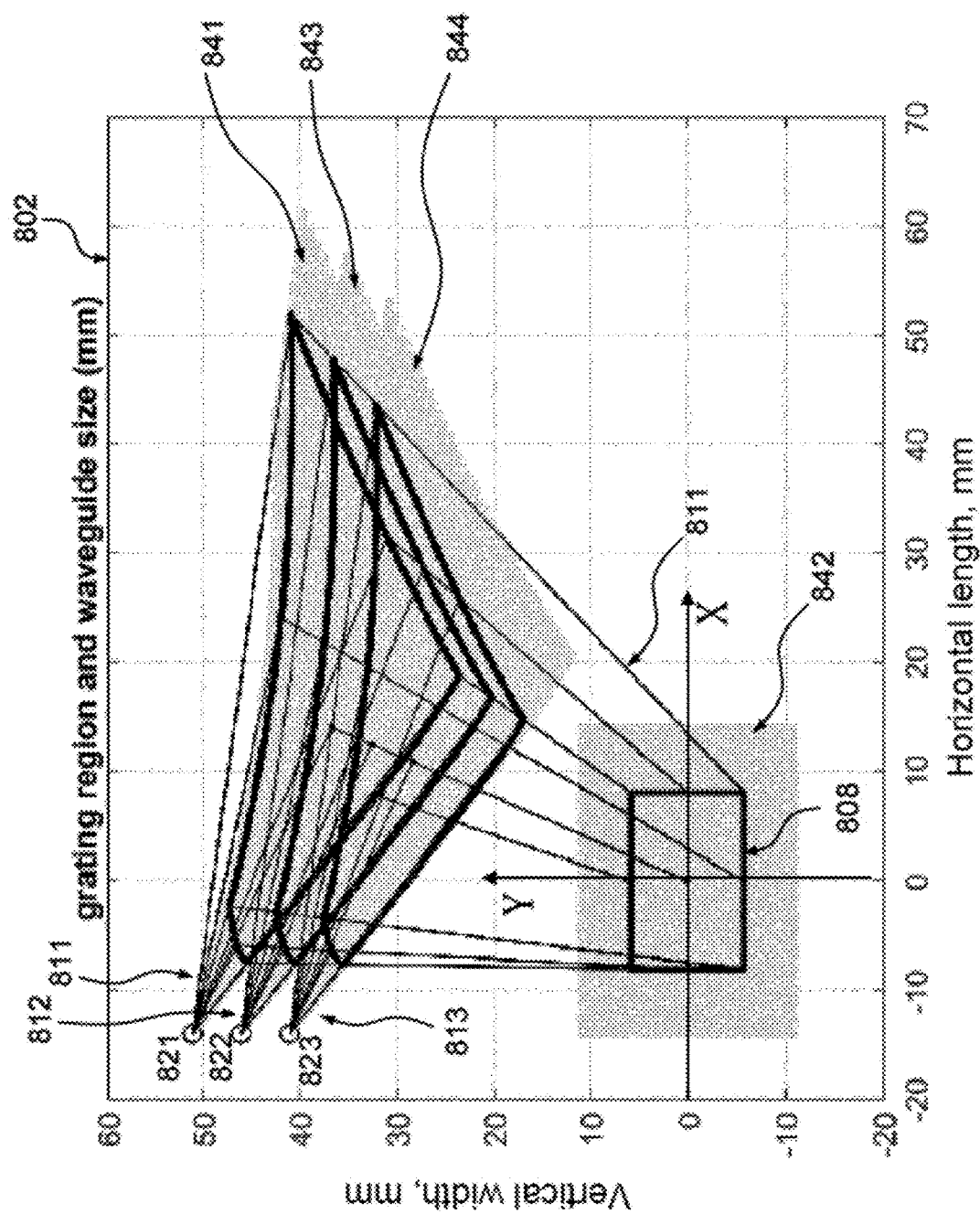
FIG. 8 is a plan ray-trace view of a waveguide configured to carry three color channels injected at different locations on the waveguide, the top gratings including reflective diffraction VBGs.

Turning to FIG. 8, a waveguide 802 is similar to the waveguide 292 of FIG. 2A with reflective VBGs in the first diffraction grating 241. The waveguide 802 of FIG. 8 includes first 821, second 822, and third 823 input ports for receiving first 811, second 812, and third 813 beams of image light carrying the image in first, second, and third wavelength bands respectively, and a pair of outer optical surfaces for propagating image light between the surfaces. The first 821, second 822, and third 823 input ports may be offset in a direction of Y-axis as shown. A first diffraction grating 841 includes a plurality of VBGs configured to expand the first beam 811 along the X-axis and to redirect the first beam 811 towards a second diffraction grating 842. A third diffraction grating 843 includes a plurality of VBGs configured to expand the second beam 812 along the-X-axis and to redirect the second beam 812 towards the second diffraction grating 842. A fourth diffraction grating 844 includes a plurality of VBGs configured to expand the third beam 813 along the X-axis and to redirect the third beam 813 towards the second diffraction grating 842. The first, second, and third wavelength bands may correspond to red (R), green (G), and blue (B) channels of the image.

The second diffraction grating 842 includes a plurality of VBGs configured to receive the first 811, second 812, and third 813 beams from respectively the first 841, third 843, and fourth 844 diffraction gratings and to out-couple different portions of the respective first, second, and third wavelength bands along the Y-axis, thereby expanding the first 811, second 812, and third 813 beams along the Y-axis for observation of the image by a user at an eyebox 808, as has been explained above w.r.t. FIG. 5. At least two top gratings, e.g. the first diffraction grating 841 (FIG. 8) and the third diffraction grating 843 coupled to the first 821 and second 822 input ports respectively, may be provided. To have different redirection angles for the left and right sides of the first 841, second 842, and fourth 844 diffraction gratings, the VBGs of these gratings may have grating periods spatially varying in going from left to right, i.e. along the X-axis.

The VBGs of the first 841, third 843, and fourth 844 diffraction gratings include grooves at an angle of approximately 21 degrees w.r.t. the Y-axis, tilted at about 47 degrees w.r.t. the waveguide 802 surface. The VBGs of the second diffraction grating 842 include grooves at an angle of approximately 111 degrees w.r.t. the Y-axis, tilted at about 29 degrees w.r.t. the waveguide 802 surface. At these tilt angles, the VBGs redirect the beams 811, 812, and 813 of image light primarily by reflective diffraction; a diagonal FOV of 60 degrees is provided at the size of a grating area of the waveguide 802 of only 75×62 mm.

Figure 9:
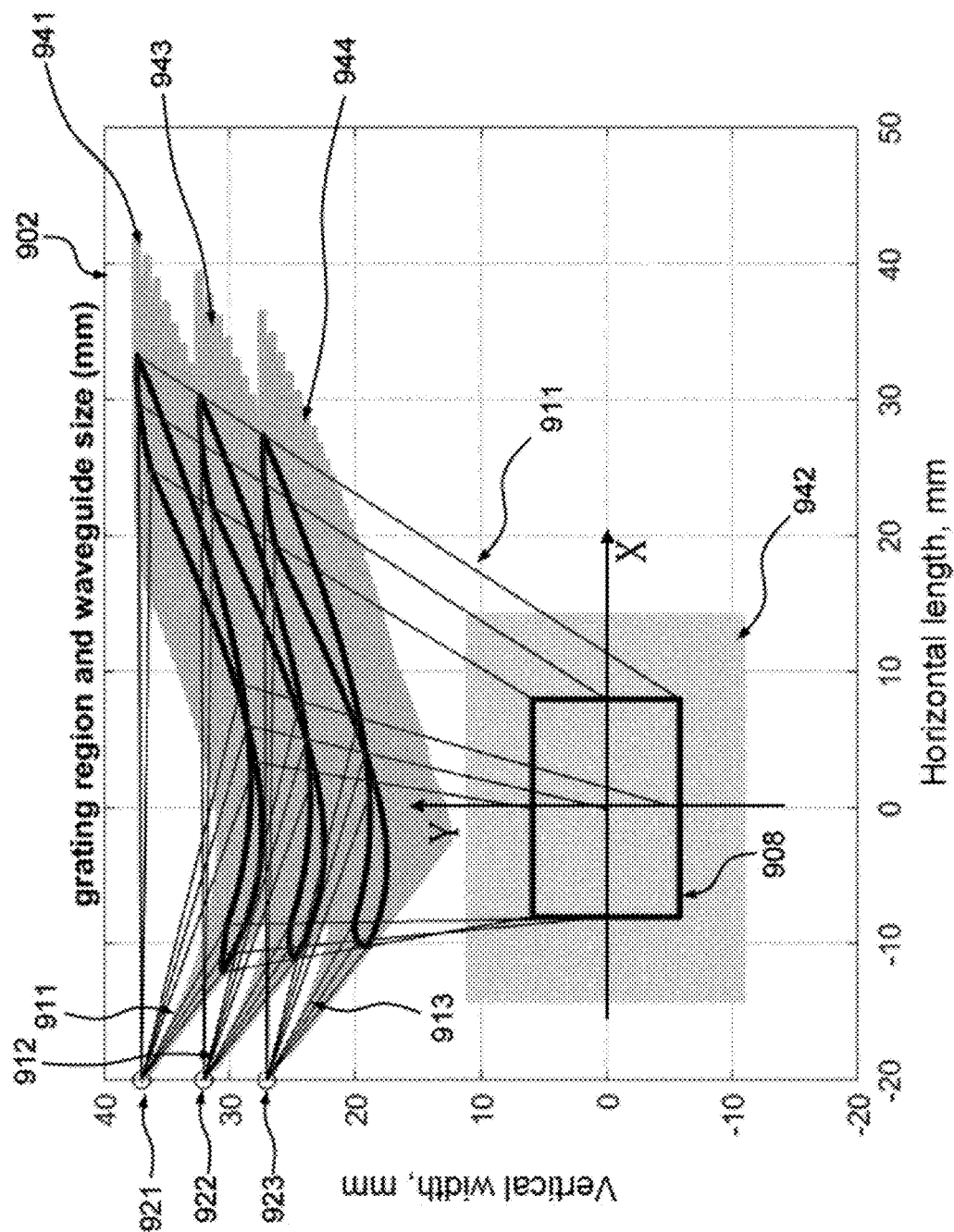
FIG. 9 is a plan ray-trace view of a waveguide configured to carry three color channels injected at different locations on a waveguide, the top gratings including transmissive diffraction VBGs.

Referring to FIG. 9, a waveguide 902 includes "transmissive diffraction" top gratings, and is otherwise similar to the waveguide 802 of FIG. 8. The waveguide 902 of FIG. 9 includes first 921, second 922, and third 923 input ports for receiving first 911, second 912, and third 913 beams of image light carrying the image in first, second, and third wavelength bands respectively, and a pair of outer optical surfaces for propagating image light between the surfaces. The first 921, second 922, and third 923 input ports may be offset in a direction of Y-axis, as shown. A first diffraction grating 941 includes a plurality of VBGs configured to expand the first beam 911 generally along X-axis and to redirect the first beam 911 towards a second diffraction grating 942. A third diffraction grating 943 includes a plurality of VBGs configured to expand the second beam 912 generally along the X-axis and to redirect the second beam 912 towards the second diffraction grating 942. A fourth diffraction grating 944 includes a plurality of VBGs configured to expand the third beam 913 generally along the X-axis and to redirect the third beam 913 towards the second diffraction grating 942.

The second diffraction grating 942 includes a plurality of VBGs configured to receive the first 911, second 912, and third 913 beams from respectively the first 941, third 943, and fourth 944 diffraction gratings and to out-couple different portions of the respective first, second, and third wavelength bands along the Y-axis, thereby expanding the first 911, second 912, and third 913 beams along the Y-axis for observation of the image by a user at an eyebox 908.

The VBGs of the first 941, third 943, and fourth 944 diffraction gratings include grooves at an angle of approximately 30 degrees w.r.t. the Y-axis, tilted at about 90 degrees w.r.t. the waveguide 802 surface. At these tilt angles, the VBGs redirect the beams 911, 912, and 913 of image light primarily by transmissive diffraction. The VBGs of the second diffraction grating 842 include grooves at an angle of approximately 102 degrees w.r.t. the Y-axis, tilted at about 60 degrees w.r.t. the waveguide 802 surface; a diagonal FOV of 60 degrees is provided at the size of the waveguide 802 of 60×70 mm.

Figure 10:
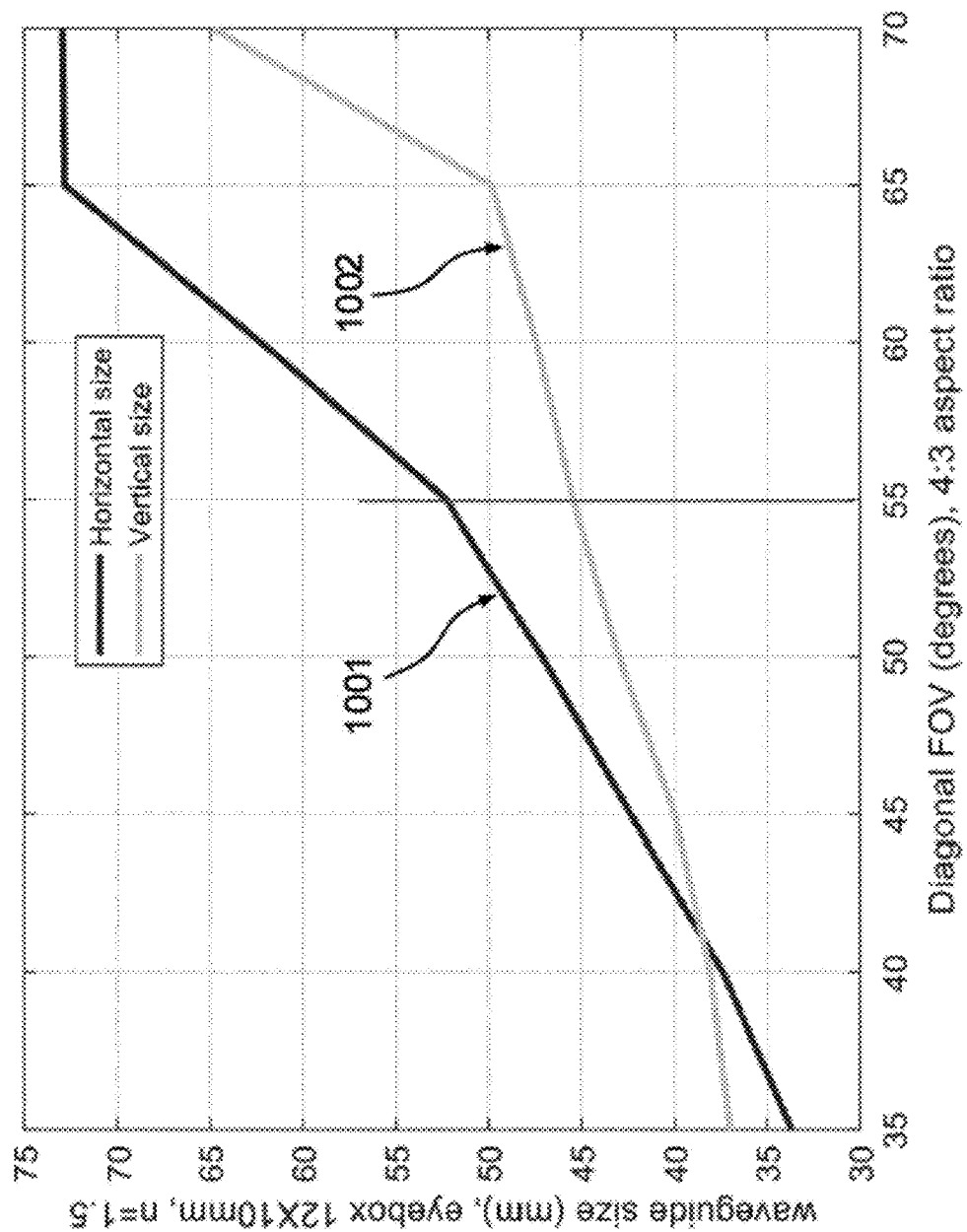
FIG. 10 is a plot of waveguide size vs. diagonal field of view (FOV)

Turning to FIG. 10, a required horizontal 1001 and vertical 1002 waveguide size is plotted against a diagonal FOV in degrees at 12×10 mm eyebox and 4:3 aspect ratio. The refractive index of the waveguide is taken to be 1.5. It is seen that the required diagonal FOV is a primary factor driving overall waveguide size at a given size of the eyebox.

In accordance with an aspect of this disclosure, one may reduce overall waveguide size by segmenting the image FOV and providing different optical input ports for inputting optical signals carrying the different FOV segments. By way of a non-limiting, illustrative example, a NED 1100 of FIGS. 11A and 11B includes not one but two projectors, a first projector 1104 and a second projector 1105 (FIG. 12B). The first 1111 and second 1112 beams of image light emitted by the first 1104 and second 1105 projectors carry first and second portions, respectively, of the FOV of the image, e.g. conterminous or partially overlapping portions of the FOV. A waveguide 1102 is optically coupled to the first 1104 and a second 1105 projectors at first 1121 and second 1122 input ports, respectively. The first 1121 and second 1122 input ports are disposed at the first optical surface 1131 at opposite sides of the waveguide 1102, i.e. at left and right sides in FIGS. 11A and 11B. The waveguide 1102 can be based on a transparent flat plate or slab having opposed first 1131 and second 1132 outer optical surfaces for propagating the first 1111 and second 1112 beams therebetween. A first diffraction grating 1141 includes a first portion 1191 (solid outline) configured to expand the first beam 1111 along a first axis 1151, and a second portion 1192 (dashed outline) configured to expand the second beam 1112 along the first axis 1151. The first 1191 and second 1192 portions may overlap as shown. The first 1111 and second 1112 beams are then out-coupled from the waveguide 1102 for observation of the first and second portions of the FOV of the image at an eyebox 1108 by a user's eye 1106. The beams 1111, 1112 may be out-coupled by a second diffraction grating 1142.

Figure 11A:
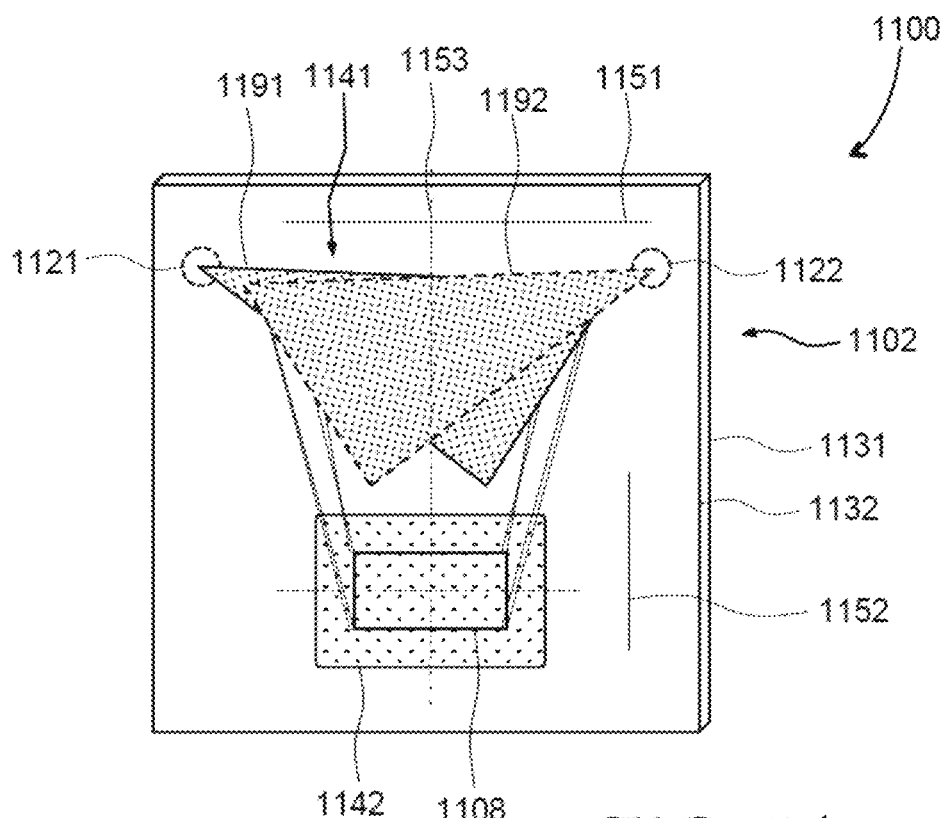
FIG. 11A is a plan view of a near-eye display (NED) including a waveguide having two input ports for two FOV halves.
Figure 11B:
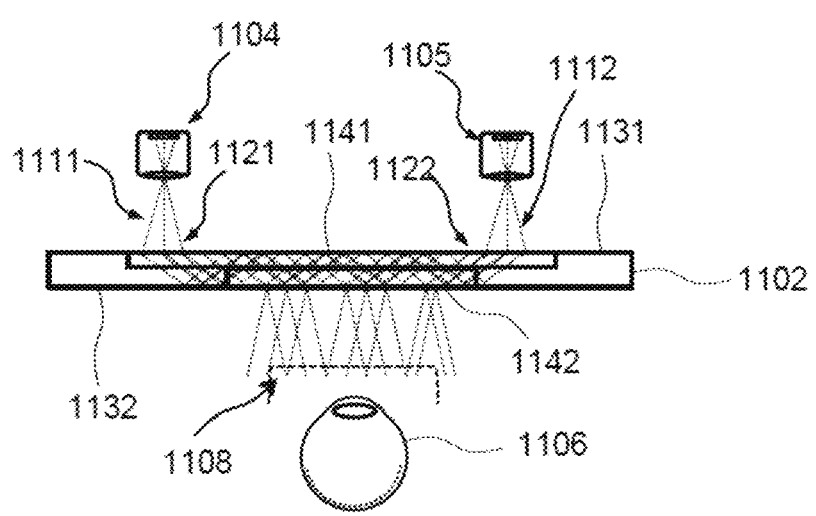
FIG. 11B is a side cross-sectional view of the NED of FIG. 11A.

In the embodiment shown in FIGS. 11A and 11B, the first 1141 and second 1142 diffraction gratings are disposed in the waveguide 1102 between the first 1131 and second 1132 optical surfaces of the waveguide 1102 and are offset laterally from each other as shown. The first 1141 and second 1142 diffraction gratings are not overlapping, i.e. their projections onto the first 1131 or second 1132 surfaces are not overlapping one another, although in other embodiments, they may overlap. The first diffraction grating 1141 of FIG. 11A includes a plurality of VBGs configured to expand the first 1111 and second 1112 beams along the first axis 1151 and to redirect the first 1111 and second 1112 beams towards the second diffraction grating 1142. The second diffraction grating 1142 includes a plurality of VBGs configured to receive the first 1111 and second 1112 beams from the first diffraction grating 1141, to expand the first 1111 and second 1112 beams along a second axis 1152, and to out-couple the first 1111 and second 1112 beams from the waveguide 1102 for observation of the first and second portions of the FOV of the image by a user's eye 1106 at an eyebox 1108. At least one, or both diffraction gratings 1141 and 1142 may be symmetric with respect to an axis 1153 equidistant from the first 1121 and second 1122 input ports, although a strict symmetry is not required.

Figure 12:
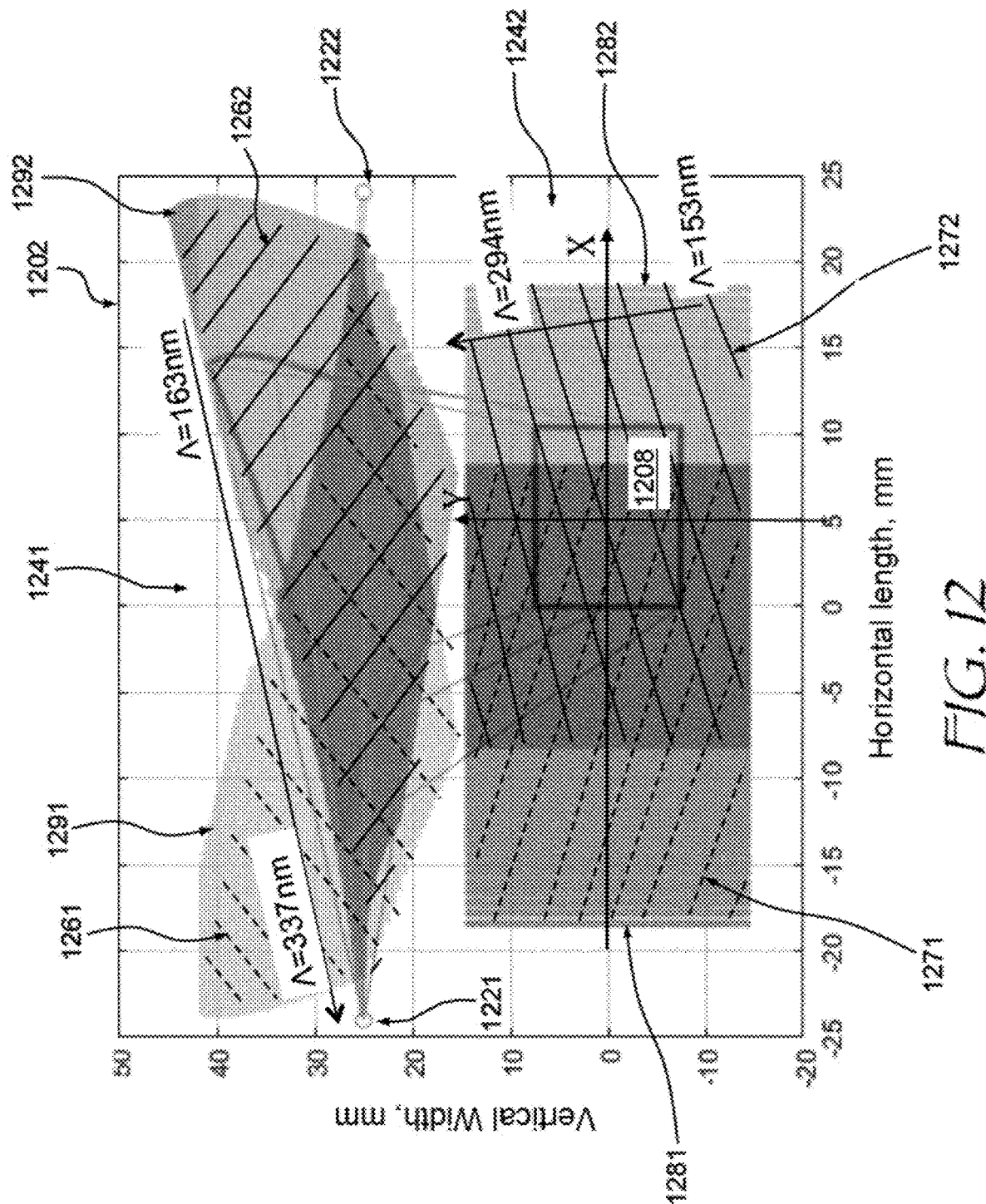
FIG. 12 is a plan ray-trace view of an embodiment of the waveguide of FIGS. 11A and 11B, the top gratings including reflective diffraction VBGs sending light from left projector to right FOV half, and vice versa.

Referring to FIG. 12, a waveguide 1202 is an embodiment of the waveguide 1102 of FIGS. 11A and 11B. The waveguide 1202 of FIG. 12 includes a first input port 1221, a second input port 1222, a first diffraction grating 1241, and a second diffraction grating 1242. The first beam 1111 is coupled into the waveguide 1202 at the first input port 1221, and the second bean 1112 is coupled into the waveguide 1202 at the second input port 1222. The first diffraction grating 1241 includes a first portion 1291 having a plurality of VBGs with fringes 1261 shown by dashed lines, and a second portion 1292 having a plurality of VBGs with fringes 1262 shown by solid lines. The fringes 1261 of the first portion are configured to expand the first beam 1111 along X-axis and to direct the first beam 1111 towards the second diffraction grating 1242. Similarly, the fringes 1262 of the second portion 1292 are configured to expand the second beam 1112 along the X-axis and to direct the second beam 1112 towards the second diffraction grating 1242.

In the embodiment shown in FIG. 12, the first input port 1221 is disposed at a left side of the waveguide 1202 for in-coupling image light directed to a right half of the FOV, and the second input port 1222 is disposed at a right side of the waveguide 1202 for in-coupling image light directed to a left half of the FOV. The period of the fringes of the VBGs of the first 1291 and second 1292 portions of the first diffraction grating 1241, as measured along a corresponding k-vector of the first diffraction grating 1241, varies from 163 nm to 337 nm. The fringe period variation is required so that the beams 1111, 1112 have a sharper diffraction angle on ends opposite to respective input ports 1221, 1222 (shorter periods) as compared to the ends close to the input ports 1221, 1222 (longer periods). The fringes 1261, 1262 of the VBGs are oriented at approximately 50 degrees with respect to Y-axis and have a tilt with respect to optical surfaces of the waveguide 1202 of about 48 degrees. At these tilt angles, the VBGs redirect the first 1111 and second 1112 beams of image light primarily by reflective diffraction.

The second diffraction grating 1242 may also have two portions, 1281 and 1282, having fringes 1271 (dashed lines) and 1272 (solid lines), respectively, for expanding the first 1111 and second 1112 beams, respectively, along Y-axis and for outputting the first 1111 and second 1112 beams at an eyebox 1208 for observation by a user. The fringe period of the fringes 1271 and 1272 of the second diffraction grating varies from 153 nm to 294 nm to provide pupil expansion by wavelength division, as described above with reference to FIGS. 4A, 4B, and FIG. 5. The fringes 1271, 1272 (FIG. 12) are oriented at approximately 74 degrees with respect to Y-axis and have a tilt with respect to optical surfaces of the waveguide 1202 of about 30 degrees. The overall size of a grating area of the waveguide 1202 is 48×60 mm.

Figure 13A:
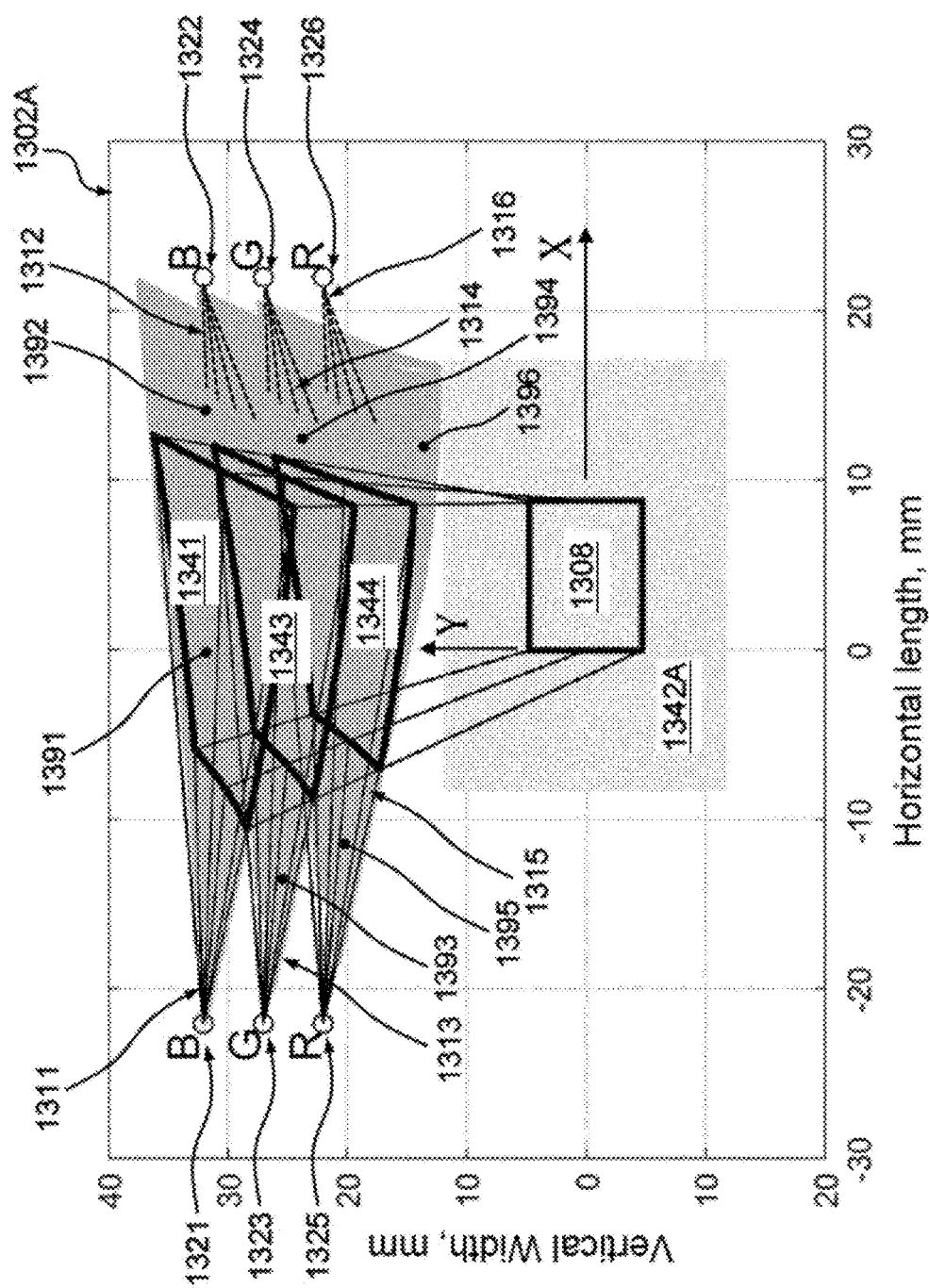
FIG. 13A is a plan ray-trace view of a waveguide configured to carry three color channels injected at different locations on a waveguide, the top gratings including reflective diffraction VBGs configured for sending light from left projector to right FOV half, and vice versa.

In some embodiments, the input ports 1221 and 1222 are in-coupling two portions of a FOV of a same single color channel, and different input ports are provided for different color channels, similarly to the waveguide 802 of FIG. 8. FIG. 13A illustrates such an embodiment. A waveguide 1302A has first 1321 and second 1322 input ports for receiving first 1311 and second 1312 beams of image light carrying the first and second portions, respectively, of the FOV of a blue (B) channel of the image; third 1323 and fourth 1324 input ports for receiving third 1313 and fourth 1314 beams of image light carrying the first and second portions, respectively, of the FOV of a green (G) channel; and fifth 1325 and sixth 1326 input ports for receiving fifth 1315 and sixth 1316 beams of image light carrying the first and second portions, respectively, of the FOV of a red (R) channel of the image to be displayed. A first diffraction grating 1341 is disposed between the optical surfaces of the waveguide 1302A and includes portions 1391 and 1392 with VBGs configured to expand the first 1311 and second 1312 beams, respectively, along X-axis and to direct the first 1311 and second 1312 beams towards a second diffraction grating 1342A. A third diffraction grating 1343 is disposed between the optical surfaces of the waveguide 1302A and is offset laterally from the first 1341 and second 1342A diffraction gratings. The third diffraction grating includes portions 1393 and 1394 with VBGs configured to expand the third 1313 and fourth 1314 beams, respectively, along X-axis and to redirect the third 1313 and fourth 1314 beams towards the second diffraction grating 1342A. Similarly, a fourth diffraction grating 1344 may be disposed between the optical surfaces of the waveguide 1302A and is offset laterally from the first 1341, second 1342A, and third 1343 diffraction gratings. The fourth diffraction grating 1344 includes portions 1395 and 1396 with VBGs configured to expand the fifth 1315 and sixth 1316 beams, respectively, along X-axis and to redirect the fifth 1315 and sixth 1316 beams towards the second diffraction grating 1342A.

The VBGs of the second diffraction grating 1342A are configured to receive the first 1311 and second 1312 beams from the first diffraction grating 1341, the third 1313 and fourth 1314 beams from the third diffraction grating 1343, and the fifth 1315 and sixth 1316 beams from the fourth diffraction grating 1344; to expand the beams 1311-1316 along the Y-axis; and to out-couple the beams 1311-1316 from the waveguide 1302A at an eyebox 1308 for observation of the image by the user. The light from left-side first 1321, third 1323, and fifth 1325 input ports is sent to a right half of the FOV at the eyebox 1308, and the light from right-side second 1322, fourth 1324, and sixth 1326 input ports is sent to a left half of the FOV at the eyebox 1308 in FIG. 13A.

Fringes of the VBGs of the first 1341, third, 1343, and fourth 1344 diffraction gratings are oriented at approximately 45 degrees with respect to Y-axis and have a tilt with respect to the optical surfaces of the waveguide 1302A of about 51 degrees. At these tilt angles, the VBGs redirect the beams 1311-1316 of image light primarily by reflective diffraction. The VBG fringes of the second diffraction grating 1342A are oriented at approximately 75 degrees with respect to Y-axis and have a tilt with respect to the optical surfaces of the waveguide 1302A of about 60 degrees. The overall size of a grating area of the waveguide 1302A is ~50×50 mm. The waveguide 1302A size can be reduced due to a compact placement of the waveguides.

Figure 13B:
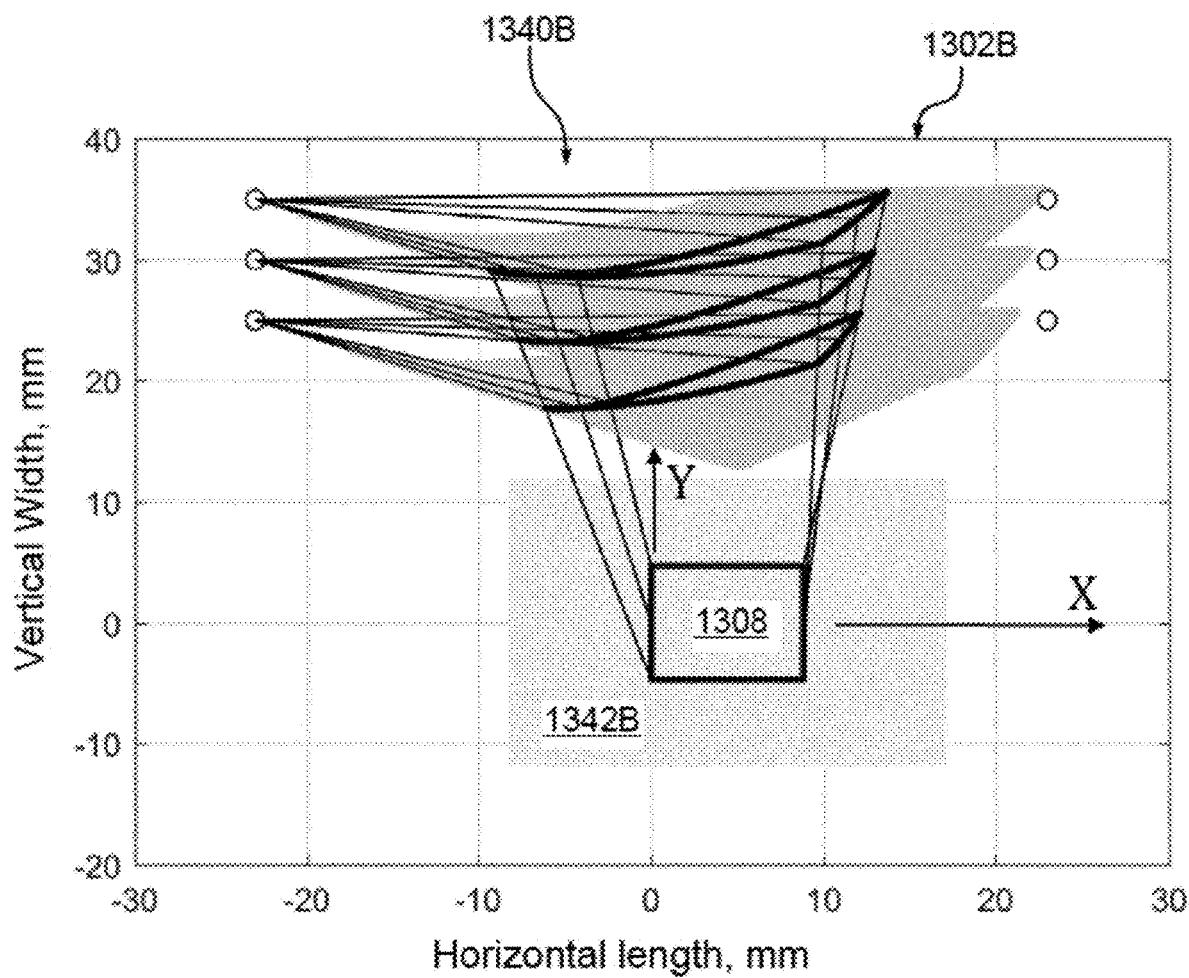
FIG. 13B is a plan ray-trace view of a waveguide configured to carry three color channels injected at different locations on a waveguide, the top gratings including transmissive diffraction VBGs configured for sending light from left projector to right FOV half, and vice versa.

Turning to FIG. 13B, a waveguide 1302B is similar to the waveguide 1302A of FIG. 13A, but has a different orientation of the VBG grooves, and slightly different shape. The top diffraction gratings 1340B corresponding to the first 1341, third 1343, and fourth 1344 diffraction gratings of FIG. 13A, have VBG fringes at 41 degrees w.r.t. Y-axis, tilted at 90 degrees w.r.t. the optical surfaces of the waveguide 1302B; this corresponds to a transmissive diffraction grating configuration. A bottom diffraction grating 1342B, corresponding to the second diffraction grating 1342A in FIG. 13A, has VBG fringes at 77 degrees w.r.t. Y-axis, tilted at 60 degrees w.r.t. the optical surfaces of the waveguide 1302B. The image light is outputted at the eyebox 1308. The overall size of a grating area of the waveguide 1302B of FIG. 13B is ~50×45 mm. The waveguide 1302B size can be reduced due to more compact placement of the waveguides.

Figure 13C:
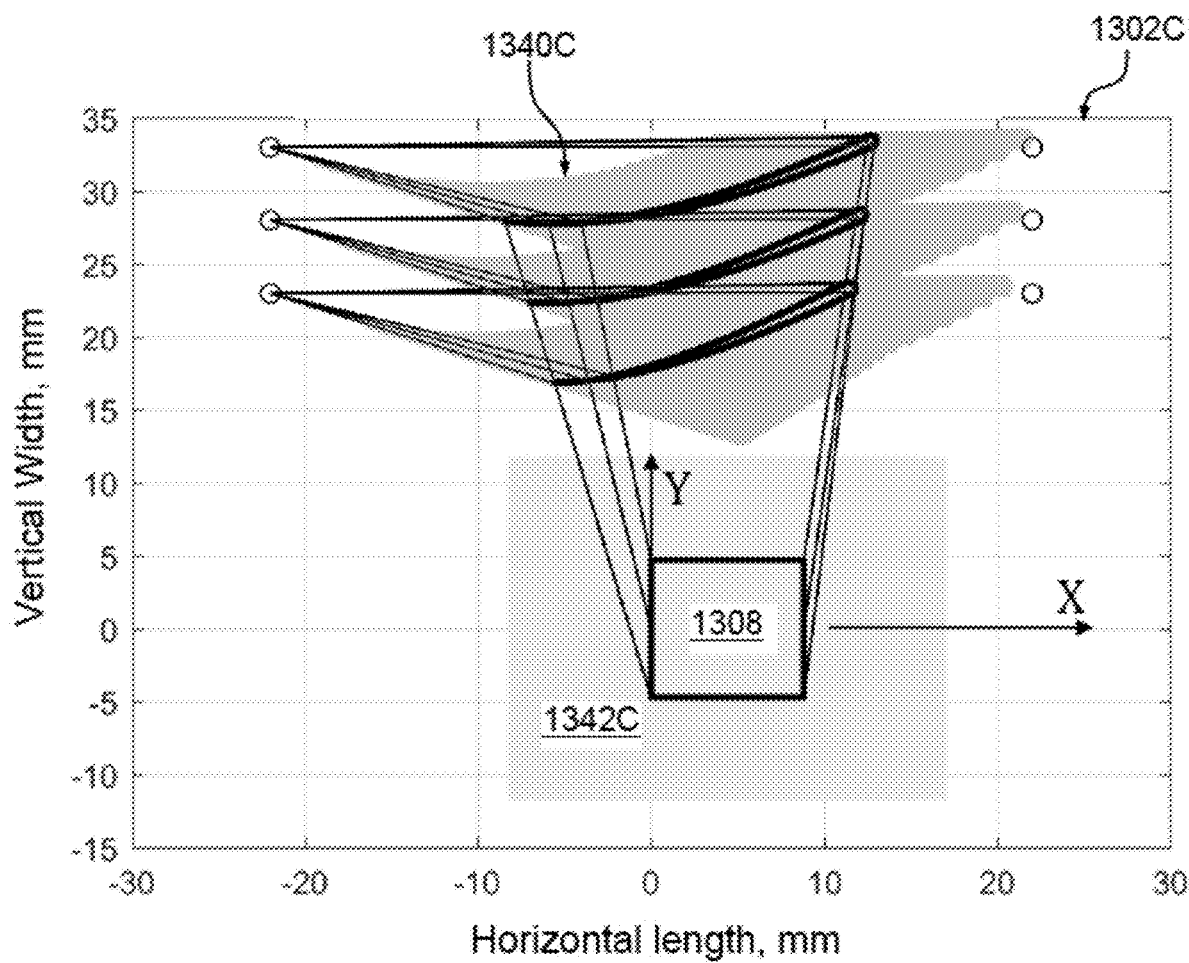
FIG. 13C is a plan ray-trace view of another embodiment of a waveguide configured to carry three color channels injected at different locations on the waveguide, the top gratings including transmissive diffraction VBGs configured for sending light from left projector to right FOV half, and vice versa.

Turning now to FIG. 13C, a waveguide 1302C is similar to the waveguide 1302A of FIG. 13A, but has a different orientation of the VBG grooves and a slightly different shape. The top diffraction gratings 1340C corresponding to the first 1341, third 1343, and fourth 1344 diffraction gratings of FIG. 13A, have VBG fringes at 42 degrees w.r.t. Y-axis, tilted at 90 degrees w.r.t. the optical surfaces of the waveguide 1302B; this corresponds to a transmissive diffraction grating configuration. A bottom diffraction grating 1342C, corresponding to the second diffraction grating 1342A in FIG. 13A, has VBG fringes at 78 degrees w.r.t. Y-axis, tilted at 32 degrees w.r.t. the optical surfaces of the waveguide 1302B. The image light is outputted at the eyebox 1308. The overall size of a grating area of the waveguide 1302C of FIG. 13C is ~50×45 mm. The waveguide 1302C size can be reduced due to a compact placement of the waveguides.

Figure 13D:
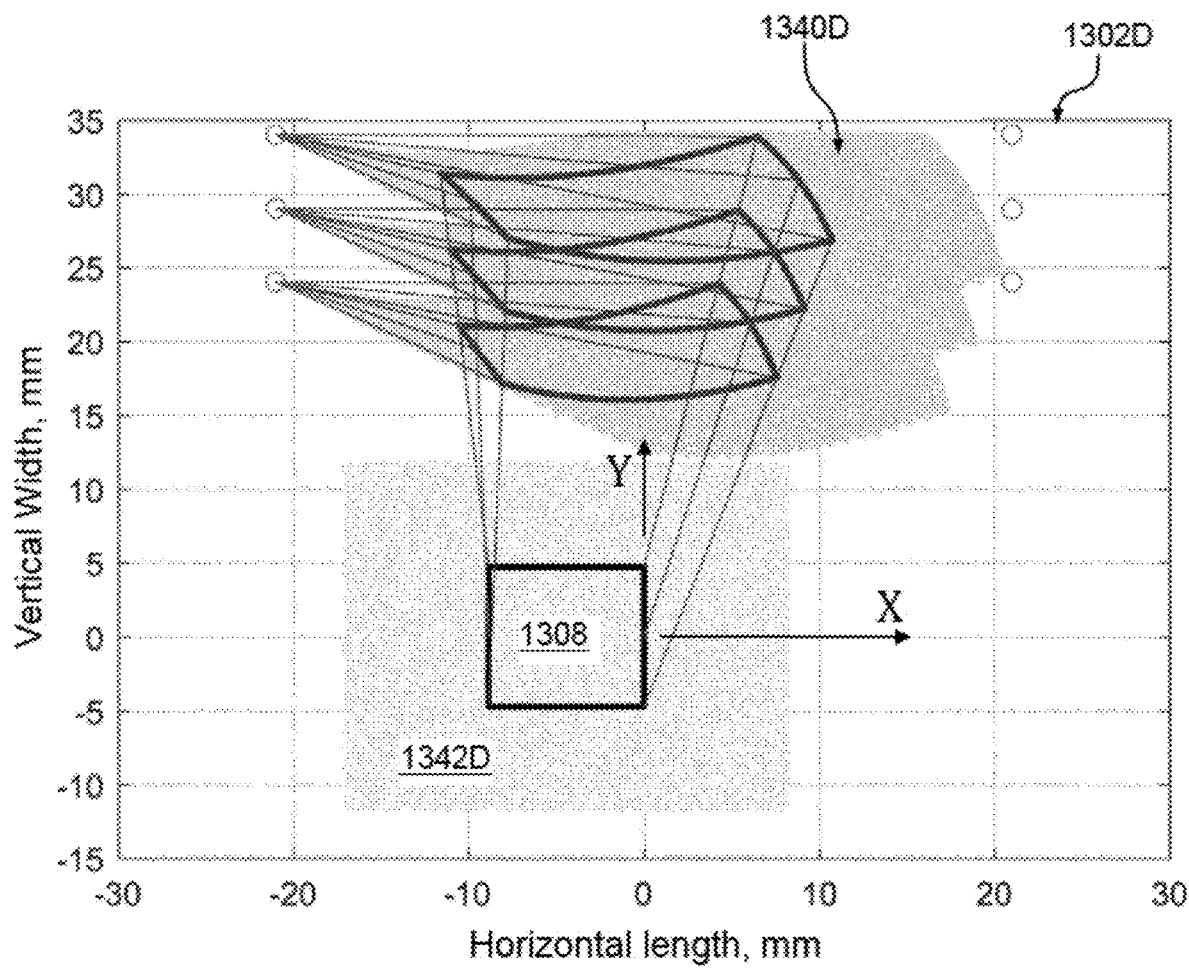
FIG. 13D a plan ray-trace view of an embodiment of a waveguide configured to carry three color channels injected at different locations on the waveguide, the top gratings including reflective diffraction VBGs sending light from left projectors to left FOV half, and light from right projectors to right FOV half.

Referring to FIG. 13D, a waveguide 1302D is similar to the waveguide 1302A of FIG. 13A, but has a different orientation of VBG fringes, such that the light from left-side input ports is sent to a left half of the FOV at the eyebox 1308, and the light from right-side input ports is sent to a right half of the FOV. The VBG fringes of top diffraction gratings 1340D are tilted w.r.t Y-axis of about 35 degrees and form an angle with top or bottom planes of the waveguide 1302D of about 51 degrees (transmissive grating configuration); and the VBG fringes of bottom diffraction gratings 1342D are tilted w.r.t Y-axis of about 106 degrees and form an angle with top or bottom planes of the waveguide 1302D of about 60 degrees (transmissive grating configuration). The diagonal full FOV is about 60 degrees. The waveguide size depends on the required diagonal FOV; the required horizontal and vertical waveguide size may vary from 30-35 mm to about 65 mm to obtain the diagonal FOV in the range of 35 to 75 degrees.

Figure 13E:
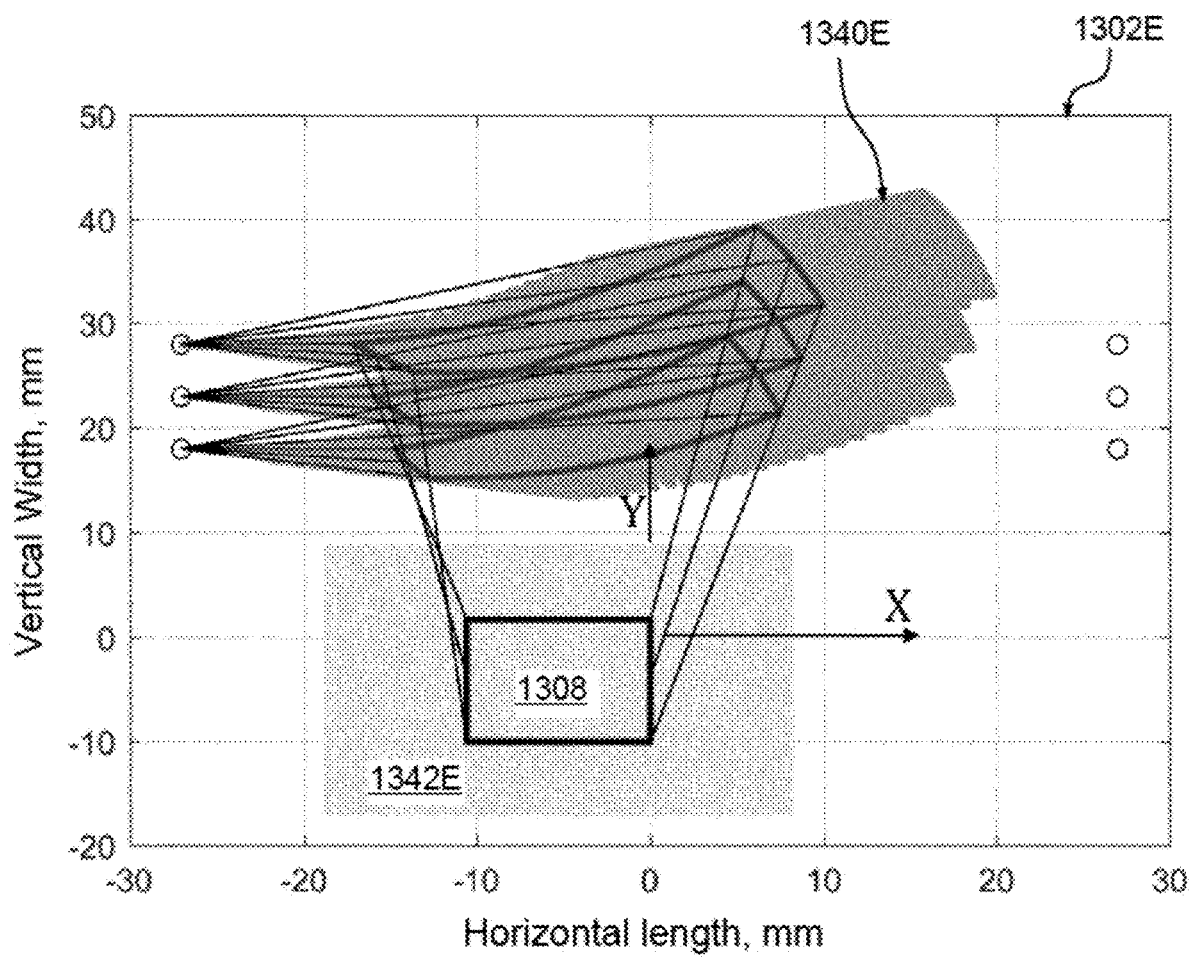
FIG. 13E a plan ray-trace view of another embodiment of the waveguide of FIG. 13D.

Referring to FIG. 13E, a waveguide 1302E is similar to the waveguide 1302D of FIG. 13D. The VBG fringes of top diffraction gratings 1340E are tilted w.r.t Y-axis of about 47 degrees and form an angle with top or bottom planes of the waveguide 1302E of about 54 degrees (transmissive grating configuration); and the VBG fringes of bottom diffraction gratings 1342E are tilted w.r.t Y-axis of about 100 degrees and form an angle with top or bottom planes of the waveguide 1302E of about 63 degrees (transmissive grating configuration). The diagonal full FOV is about 70 degrees. The waveguide size depends on the required diagonal FOV; the required horizontal and vertical waveguide size may vary from 30-35 mm to about 55 mm to obtain the diagonal FOV in the range of 35 to 70 degrees.

Figure 13F:
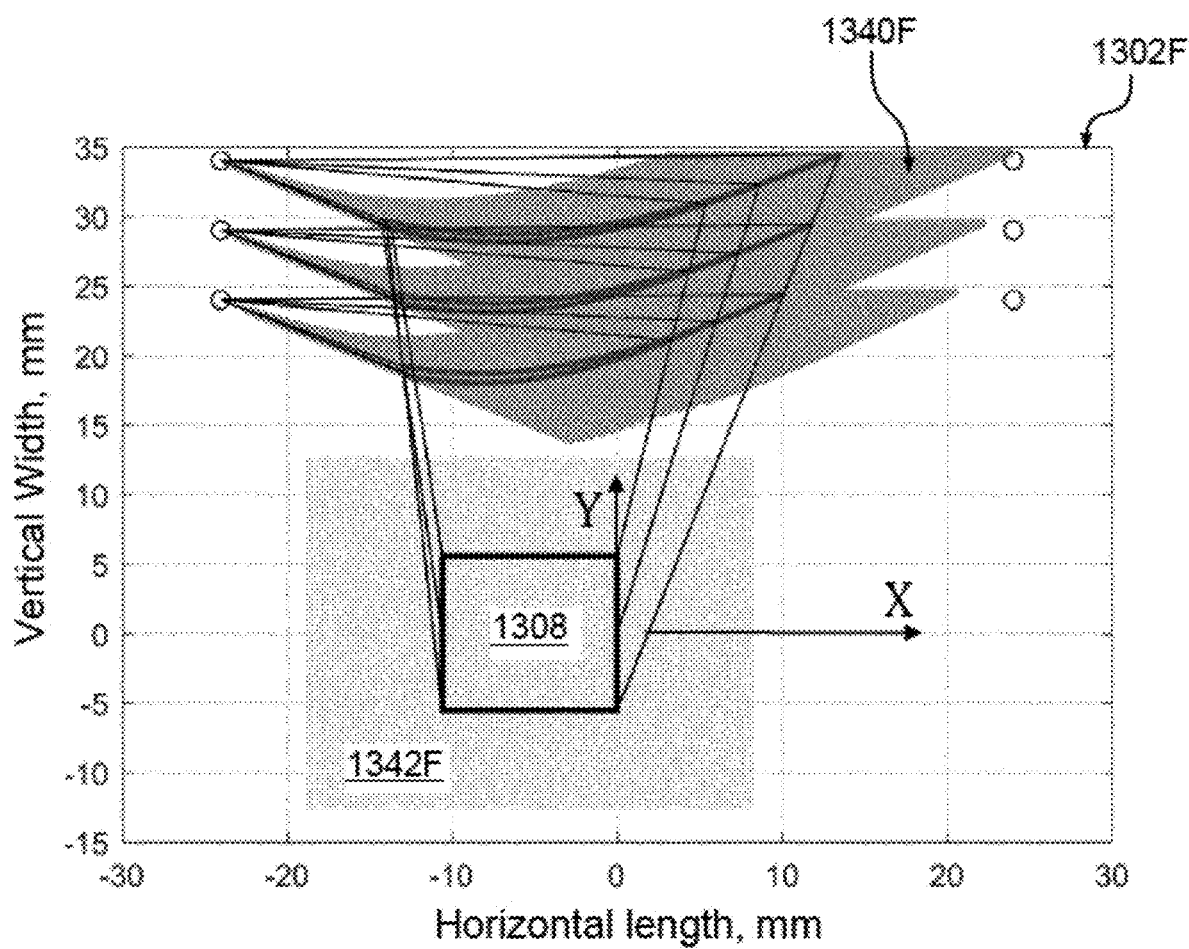
FIG. 13F a plan ray-trace view of an embodiment of a waveguide configured to carry three color channels injected at different locations on the waveguide, the top gratings including transmissive diffraction VBGs sending light from left projectors to left FOV half, and light from right projectors to right FOV half.

Referring to FIG. 13F, a waveguide 1302F is similar to the waveguide 1302D of FIG. 13D. The VBG fringes of top diffraction gratings 1340F are tilted w.r.t Y-axis of about 36 degrees and form an angle with top or bottom planes of the waveguide 1302F of about 90 degrees (transmissive grating configuration); and the VBG fringes of bottom diffraction gratings 1342F are tilted w.r.t Y-axis of about 105 degrees and form an angle with top or bottom planes of the waveguide 1302F of about 32 degrees (reflective diffraction grating configuration). The diagonal full FOV is about 70 degrees. The waveguide size depends on the required diagonal FOV; the required horizontal and vertical waveguide size may vary from 30-35 mm to 60-68 mm to obtain the diagonal FOV in the range of 35 to 90 degrees.

Figure 13G:
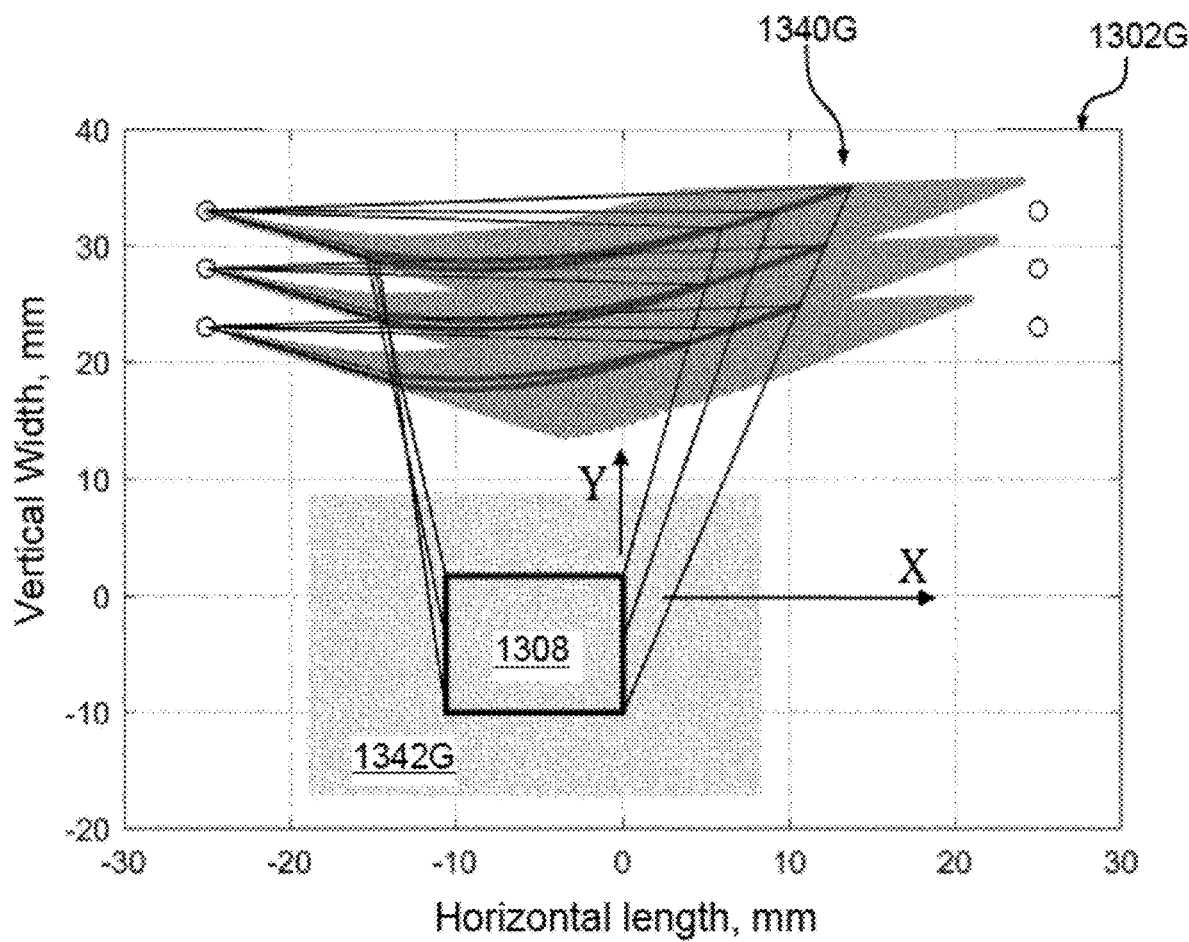
FIG. 13G a plan ray-trace view of another embodiment of the waveguide of FIG. 13F.

Referring to FIG. 13G, a waveguide 1302G is similar to the waveguide 1302F of FIG. 13F. The VBG fringes of top diffraction gratings 1340G are tilted w.r.t Y-axis of about 38 degrees and form an angle with top or bottom planes of the waveguide 1302G of about 90 degrees (transmissive grating configuration); and the VBG fringes of bottom diffraction gratings 1342G are tilted w.r.t Y-axis of about 102 degrees and form an angle with top or bottom planes of the waveguide 1302G of about 35 degrees (reflective grating configuration). The diagonal full FOV is about 70 degrees. The waveguide size depends on the required diagonal FOV; the required horizontal and vertical waveguide size may vary from 30-35 mm to 60-68 mm to obtain the diagonal FOV in the range of 35 to 90 degrees. In FIGS. 13A to 13G, the FOV aspect ratio is 16:9.

Figure 14A:
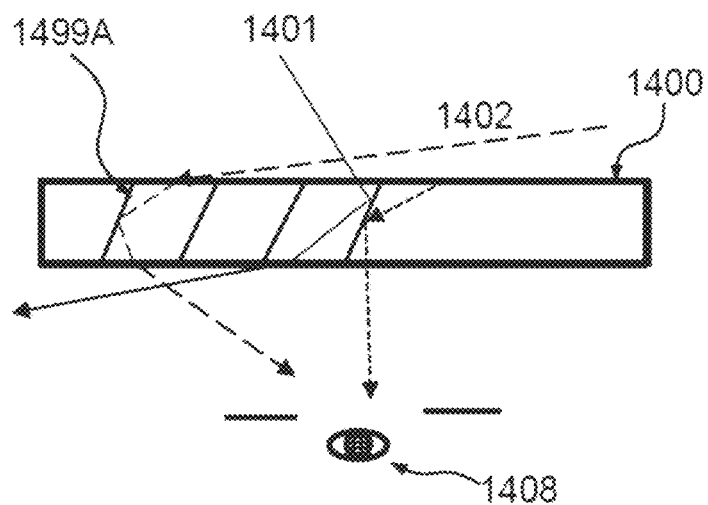
FIGS. 14A to 14C are side cross-sectional schematic views showing different types of rainbow artifacts.
Figure 14B:
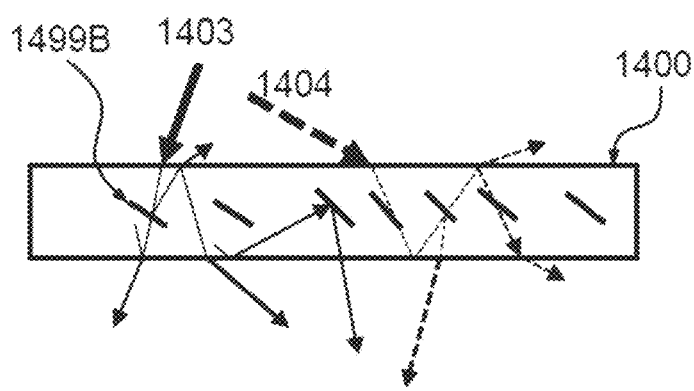
Figure 14C:
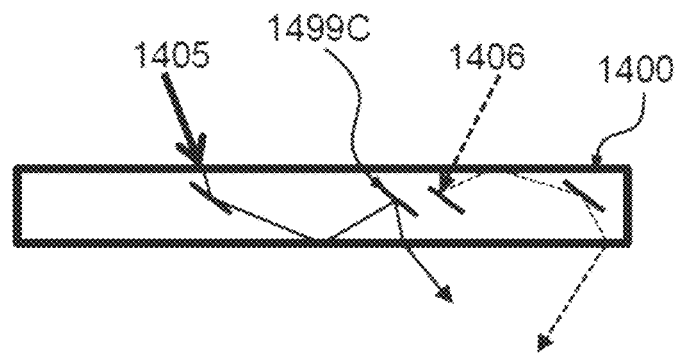

FIGS. 14A, 14B, and 14C show possible pathways for external light to reflect from VBG fringes of the out-coupling diffraction gratings thereby causing artifacts due to so-called "rainbow" effect. The magnitude of the rainbow artifacts depends on density and orientation of VBG fringes. Fringes 1499A, 1499B, and 1499C of the VBGs in a waveguide 1400 can create rainbow paths 1401, 1402 (FIG. 14A); 1403, 1404 (FIG. 14B); and 1405, 1406 (FIG. 14C) for light to reach the user's eye 1408. In the configurations presented, the waveguide 1302A of FIG. 13A does not exhibit any rainbow effects; the waveguide 1302B of FIG. 13B can have rainbow path 1401 in the top diffraction gratings 1340B; and waveguide 1302C of FIG. 13C (smallest of all three) can have rainbow paths 1403 and 1404 in the bottom diffraction grating 1342C. Similarly, the waveguides 1302D of FIG. 13D and 1302E of FIG. 13E do not exhibit any rainbow effects; while the waveguides 1302 F of FIG. 13F and 1302G of FIG. 13G can have rainbow paths 1403 and 1404 in the bottom diffraction gratings 1342F and 1342G respectively, while providing a larger diagonal FOV. Thus, a tradeoff may exist between the overall size of the waveguide at a required FOV and the presence of rainbow effects; it is to be remembered that only rainbow paths capable of reaching the user's eye 1408 need to be considered in practice.

Figure 15A:
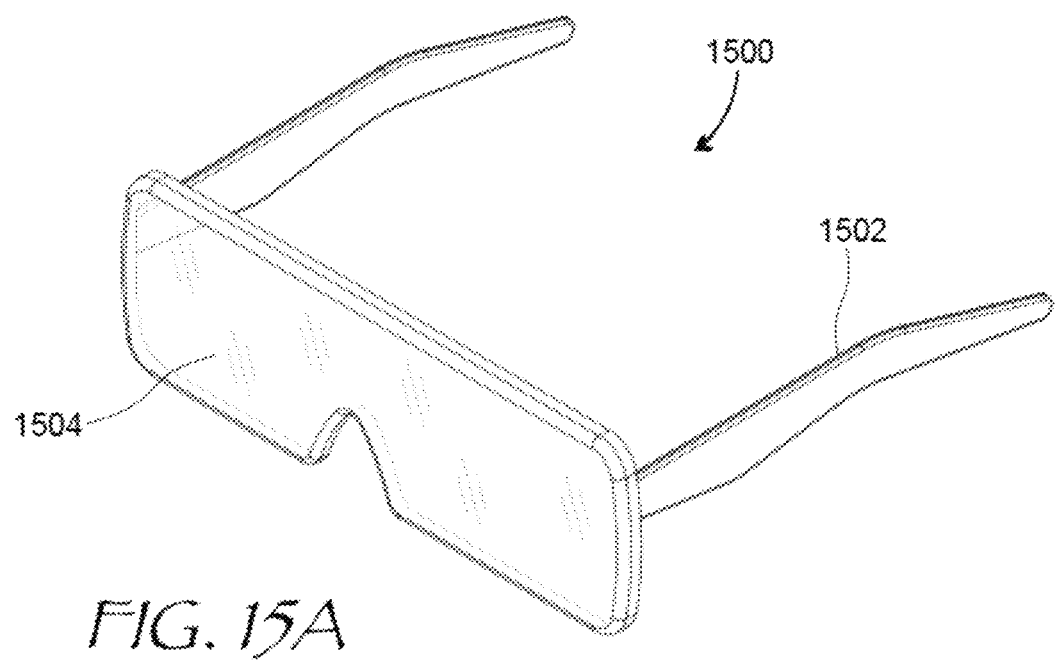
FIG. 15A is an isometric view of an eyeglasses form factor near-eye AR/VR display incorporating an optical waveguide of the present disclosure.
Figure 15B:
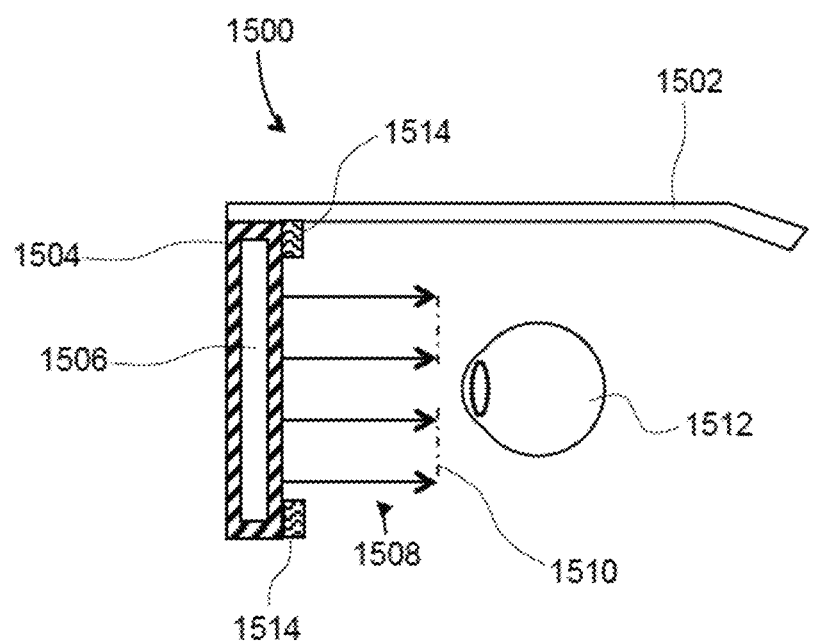
FIG. 15B is a side cross-sectional view of the display of FIG. 15A.

Referring to FIGS. 15A and 15B, a near-eye artificial reality/virtual reality (AR/VR) display 1500 may include waveguides of the present disclosure, e.g. the waveguide 102 of FIGS. 1A and 1B, the waveguide 202 of FIG. 2A, the waveguide 502 of FIG. 5, the waveguide 602 of FIG. 6, the waveguide 802 of FIG. 8, the waveguide 902 of FIG. 9, the waveguide 1102 of FIG. 11, the waveguide 1202 of FIG. 12, and/or the waveguides 1302A, 1302B, or 1302C of FIGS. 13A, 13B, and 13C respectively, to guide image light to eyeboxes 1510 of the near-eye AR/VR display 1500. A body or frame 1502 of the near-eye AR/VR display 1500 may have a form factor of eyeglasses, as shown in this example. A display unit 1504 includes a display assembly 1506 (FIG. 15B) which provides image light 1508 to the eyebox 1510, i.e. a geometrical area where a good-quality image may be presented to a user's eye 1512. The display assembly 1506 may include a separate AR/VR display module for each eye, or one AR/VR display module for both eyes. For the latter case, an optical switching device may be coupled to a single electronic display for directing images to the left and right eyes of the user in a time-sequential manner, one frame for left eye and one frame for right eye. The images may be presented fast enough, i.e. with a fast enough frame rate, that the individual eyes do not notice the flicker and perceive smooth, steady images of surrounding virtual or augmented scenery.

An electronic display of the display assembly 1506 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 1500 may also include an eye-tracking system 1514 for determining, in real time, a gaze direction and/or the vergence angle of the user's eyes 1512. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye AR/VR display 1500 may include an audio system, such as small speakers or headphones.

Figure 16:
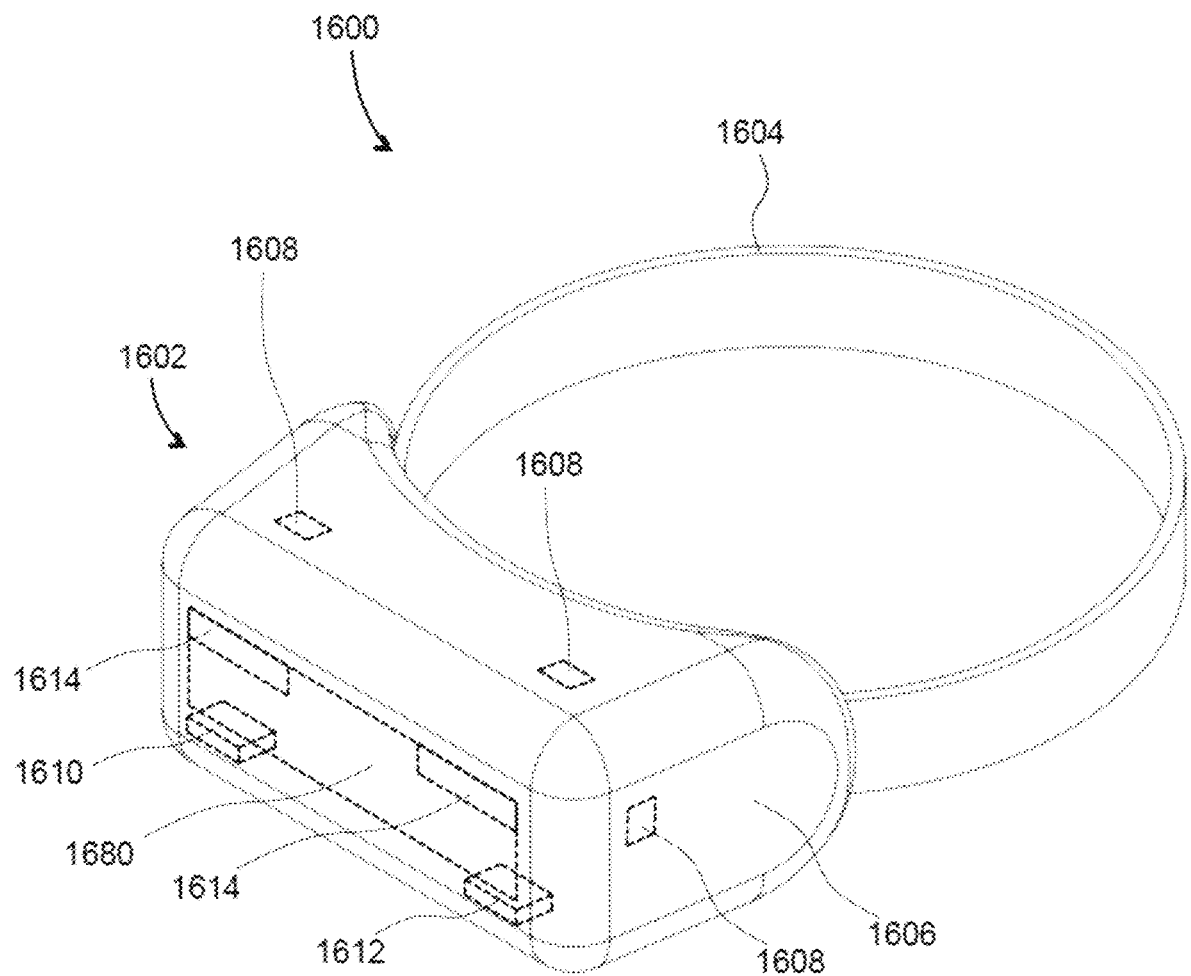
FIG. 16 is an isometric view of a head-mounted display (HMD) incorporating an optical waveguide of the present disclosure.

Turning now to FIG. 16, an HMD 1600 is an example of an AR/VR wearable display system which encloses user's face, for a greater degree of immersion into the AR/VR environment. The HMD 1600 may include any of the waveguides of the present disclosure to guide image light to eyeboxes. The HMD 1600 can present content to the user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 1600 is to augment views of a physical, real-world environment with computer-generated imagery, and/or to generate entirely virtual 3D imagery. The HMD 1600 may include a front body 1602 and a band 1604. The front body 1602 is configured for placement in front of eyes of a user in a reliable and comfortable manner, and the band 1604 may be stretched to secure the front body 1602 on the user's head. A display system 1680, including waveguides disclosed herein, may be disposed in the front body 1602 for presenting AR/VR imagery to the user. Sides 1606 of the front body 1602 may be opaque or transparent.

In some embodiments, the front body 1602 includes locators 1608, an inertial measurement unit (IMU) 1610 for tracking acceleration of the HMD 1600, and position sensors 1612 for tracking position of the HMD 1600. The locators 1608 are traced by an external imaging device of an AR/VR system, such that the AR/VR system can track the location and orientation of the entire HMD 1600. Information generated by the IMU and the position sensors 1612 may be compared with the position and orientation obtained by tracking the locators 1608, for improved tracking of position and orientation of the HMD 1600. Accurate position and orientation is important for presenting appropriate virtual scenery to the user as the latter moves and turns in 3D space.

The HMD 1600 may further include an eye tracking system 1614, which determines orientation and position of user's eyes in real time. The obtained position and orientation of the eyes allows the HMD 1600 to determine the gaze direction of the user and to adjust the image generated by the display system 1680 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1602.

What is claimed is:

1. A waveguide for conveying image light, the waveguide comprising:
    a first input port for receiving a first beam of image light carrying a first color channel of an image in a first wavelength band;
    opposed first and second optical surfaces for propagating the first beam therebetween; and
    first and second diffraction gratings disposed in the waveguide between the first and second optical surfaces and offset laterally from each other;
    wherein the first diffraction grating comprises a plurality of volume Bragg gratings (VBGs) configured to expand the first beam along a first axis and to redirect the first beam towards the second diffraction grating; and
    wherein the second diffraction grating comprises a plurality of VBGs configured to receive the first beam from the first diffraction grating and to out-couple portions of the first beam at a plurality of locations along a second axis, thereby expanding the first beam along the second axis for observation of the image by a user.

2. The waveguide of claim 1, wherein projections of the first and second diffraction gratings onto the first optical surface are non-overlapping.

3. The waveguide of claim 1, wherein the first diffraction grating comprises between 300 and 1000 VBGs, and wherein the second diffraction grating comprises between 10 and 200 VBGs.

4. The waveguide of claim 1, wherein in operation, different portions of the first wavelength band of the first beam are out-coupled at different locations of the plurality of locations along the second axis.

5. The waveguide of claim 1, further comprising:
    a second input port for receiving a second beam of image light carrying a second color channel of the image in a second wavelength band;
    a third diffraction grating disposed in the waveguide between the first and second optical surfaces and offset laterally from the first and second diffraction gratings;
    wherein the third diffraction grating comprises a plurality of VBGs configured to expand the second beam along the first axis and to redirect the second beam towards the second diffraction grating; and
    wherein the VBGs of the second diffraction grating are configured to receive the second beam from the third diffraction grating and to out-couple portions of the second beam at a plurality of locations along the second axis, thereby expanding the second beam along the second axis for observation of the image by the user.

6. The waveguide of claim 5, further comprising:
    a third input port for receiving a third beam of image light carrying a third color channel of the image in a third wavelength band;
    a fourth diffraction grating disposed in the waveguide between the first and second optical surfaces and offset laterally from the first to third diffraction gratings;
    wherein the fourth diffraction grating comprises a plurality of VBGs configured to expand the third beam along the first axis and to redirect the third beam towards the second diffraction grating; and
    wherein the VBGs of the second diffraction grating are configured to receive the third beam from the fourth diffraction grating and to out-couple portions of the third beam at a plurality of locations along the second axis, thereby expanding the third beam along the second axis for observation of the image by the user.

7. The waveguide of claim 6, wherein the first, second, and third input ports are offset from each other along the second axis.

8. The waveguide of claim 6, wherein in operation, different portions of the first, second, and third wavelength bands of the first, second, and third beams respectively are out-coupled at different locations along the second axis.

9. The waveguide of claim 1, wherein the VBGs of the first and second diffraction gratings are disposed in a same layer spaced apart from the first and second optical surfaces.

10. The waveguide of claim 1, wherein the VBGs of the first diffraction grating have grating periods spatially varying along the first axis.

11. The waveguide of claim 10, wherein the grating periods of the VBGs of the first diffraction grating are varying within a range of 100 nm to 500 nm.

12. The waveguide of claim 1, wherein the VBGs of the second diffraction grating have grating periods spatially varying along the second axis.

13. The waveguide of claim 12, wherein the grating periods of the VBGs of the second diffraction grating are varying within a range of 100 nm to 300 nm.

14. The waveguide of claim 1, wherein the VBGs of the first diffraction grating are configured to redirect the first and second beams of image light by reflective diffraction.

15. The waveguide of claim 14, wherein the VBGs of the first diffraction grating comprise a plurality of fringes forming an angle with the first optical surface of between 34 degrees and 54 degrees.

16. The waveguide of claim 15, wherein the VBGs of the second diffraction grating comprise a plurality of fringes forming an angle with the first optical surface of between 20 degrees and 38 degrees.

17. The waveguide of claim 1, wherein the VBGs of the first diffraction grating are configured to redirect the first and second beams of image light by transmissive diffraction.

18. The waveguide of claim 17, wherein the VBGs of the first diffraction grating comprise a plurality of fringes forming an angle with the first optical surface of greater than 80 degrees.

19. The waveguide of claim 18, wherein the VBGs of the second diffraction grating comprise a plurality of fringes forming an angle with the second optical surface of between 50 degrees and 70 degrees.

20. The waveguide of claim 1, wherein the image has a field of view (FOV), wherein the first beam of image light carries a first portion of the FOV of the image, the waveguide further comprising a second input port for receiving a second beam of image light carrying a second portion of the FOV of the image in the first wavelength band;
    wherein the VBGs of the first diffraction grating are configured to expand the second beam along the first axis and to redirect the second beam towards the second diffraction grating; and
    wherein the VBGs of the second diffraction grating are configured to receive the second beam from the first diffraction grating and to out-couple portions of the second beam at different locations along the second axis, thereby expanding the second beam along the second axis for observation of the image by the user.

\* \* \* \* \*